United States Patent
Rowson et al.

(10) Patent No.: US 10,196,071 B1
(45) Date of Patent: Feb. 5, 2019

(54) METHOD AND APPARATUS FOR MONITORING DRIVING BEHAVIOR OF A DRIVER OF A VEHICLE

(71) Applicant: Samsara Networks Inc., San Francisco, CA (US)

(72) Inventors: James Michael Rowson, San Francisco, CA (US); John Bicket, San Francisco, CA (US); Bodecker John Dellamaria, San Francisco, CA (US)

(73) Assignee: SAMSARA NETWORKS INC., San Francisco, CA (US)

( * ) Notice: Subject to any disclaimer, the term of this patent is extended or adjusted under 35 U.S.C. 154(b) by 0 days.

(21) Appl. No.: 15/854,522

(22) Filed: Dec. 26, 2017

(51) Int. Cl.
*B60W 50/14* (2012.01)
*B60W 40/09* (2012.01)
*G09B 19/16* (2006.01)
*G06Q 10/08* (2012.01)

(52) U.S. Cl.
CPC ............ *B60W 50/14* (2013.01); *B60W 40/09* (2013.01); *G09B 19/167* (2013.01); *B60W 2300/12* (2013.01); *B60W 2540/30* (2013.01); *G06Q 10/0832* (2013.01)

(58) Field of Classification Search
CPC ... B60W 40/09; B60W 50/14; G06Q 10/0832
USPC ............................... 701/1, 70, 410
See application file for complete search history.

(56) References Cited

U.S. PATENT DOCUMENTS

| | | | |
|---|---|---|---|
| 6,452,487 B1 | 9/2002 | Krupinski | |
| 9,477,639 B2 | 10/2016 | Fischer et al. | |
| 2002/0061758 A1 * | 5/2002 | Zarlengo | G01D 21/00 455/517 |
| 2008/0319602 A1 | 12/2008 | McClellan et al. | |
| 2011/0276265 A1 * | 11/2011 | Husain | G01C 21/3461 701/533 |
| 2014/0095061 A1 | 4/2014 | Hyde | |
| 2014/0098060 A1 | 4/2014 | McQuade et al. | |
| 2014/0195106 A1 | 7/2014 | McQuade et al. | |
| 2015/0044641 A1 | 2/2015 | Chauncey et al. | |

(Continued)

FOREIGN PATENT DOCUMENTS

EP 2388753 A1 * 11/2011 ............... G07C 5/08

OTHER PUBLICATIONS

Broughall M., "What is G-Force and How is it Related to Harsh Driving?" Geotab Inc, Dec. 14, 2016, downloaded from https://www.geotab.com/blog/what-is-g-force/, 7 pages.

(Continued)

*Primary Examiner* — Isaac G Smith
(74) *Attorney, Agent, or Firm* — Nicholson De Vos Webster & Elliott LLP

(57) ABSTRACT

A method and apparatus for automatically monitoring driving behavior of a driver of a vehicle, are described. Information pertaining to one or more loads to be transported by vehicles is received. One or more first driving behavior parameter thresholds are determined based at least in part on a first fragility indicator of a load to be transported by the vehicle during a first portion of a route. The first fragility indicator is determined at least in part based on the information pertaining to the one or more loads. The driving behavior of the driver of the vehicle is caused to be monitored during the first portion of the route based on the one or more first driving behavior parameter thresholds.

24 Claims, 14 Drawing Sheets

(56) References Cited

U.S. PATENT DOCUMENTS

2017/0039784 A1\* 2/2017 Gelbart ............. G06Q 30/0206
2018/0093672 A1\* 4/2018 Terwilliger ....... B60W 50/0098

OTHER PUBLICATIONS

"Zonar Coach Offers Real-Time In-Cab Coaching," Trucking info, Oct. 27, 2017, 8 pages.
Zonar Coach, Real-Time In-Cab Video Coaching, Zonar System, Rev on Oct. 26, 2017, 1 page.

\* cited by examiner

300

| Route 1 | Start of route location 111 | Stop location 112 | End of route location 113 |
|---|---|---|---|
| Geographical location | | | |
| Expected time for the vehicle to reach the location | Dec. 1st at 12:30AM | Dec. 1st at 1:30AM | Dec. 1st at 3PM |
| Vehicle | Vehicle 110 | Vehicle 110 | Vehicle 110 |
| Trailer | Trailer 120 | N/A | N/A |
| Load | Yes | No | No |
| fragility indicator | F1 (FRAGILE) | F2 (no load) | F2 (no load) |

Exemplary route 101 scheduled for vehicle 110 including:

1- first fragility indicator F1 for a load during a first portion of the route (from start of route location to stop location)

2- second fragility indicator F2 for a load during a second portion of the route (from the stop location to the end of route location)

Fig. 3

| | | Driving Behavior Parameters | | | |
|---|---|---|---|---|---|
| Vehicle 110 – First portion of route 101 | Vehicle 110 – Second portion of route 101 | | Acceleration Force Magnitude (Braking) (g) | Follow Distance (m) | Engine temperature (F) | Acceleration Force Magnitude (Turning) (g) |
| | | Vehicle of type 1 (e.g., Light duty vehicle) | 1.2 | 15 | 240 | 1 |
| | | Vehicle of type 2 (e.g., Medium duty vehicle) | 1 | 30 | 250 | 0.9 |
| | Yes | Vehicle of type 3 (e.g., Heavy duty vehicle) | 0.8 | 60 | 260 | 0.8 |
| Yes | Yes | Fragility indicator of a load F1 (e.g., fragile) | 0.6 | 60 | - | 0.6 |
| Yes | | Fragility indicator of a load F2 (e.g., no load) | 1.4 | 15 | - | 1.2 |
| | | Fragility indicator of a load F3 (e.g., durable) | 1.4 | 15 | - | 1.1 |

| Optimization Operation | Minimum | Maximum | Minimum | Minimum |
|---|---|---|---|---|
| First Harsh Driving Event Thresholds for first portion of route 101 | 0.6 | 60 | 260 | 0.6 |
| Second Harsh Driving Event Thresholds for second portion of route 101 | 0.8 | 60 | 260 | 0.8 |

METHOD AND APPARATUS FOR MONITORING DRIVING BEHAVIOR OF A DRIVER OF A VEHICLE

FIELD

Embodiments of the invention relate to the field of fleet management, and more specifically, to the monitoring of the driving behavior of a driver of a vehicle.

BACKGROUND

Unsafe or harsh driving behavior results in accidents causing damage to transported goods and potentially fatal casualties. Monitoring the driving behavior of a driver can help improve safety on the roads by detecting dangerous and unsafe behavior of drivers.

Monitoring the driving behavior of a driver allows for an interactive coaching of the driver during a training period. The driving behavior of a driver can be monitored by detecting harsh events that need to be recorded and/or reported to a supervisory authority. In addition, the driving behavior of a driver can be monitored by transmitting alerts and warning messages to the driver upon determination that the driving behavior of the driver may cause the occurrence of a harsh event.

SUMMARY

One general aspect includes a method of automatically monitoring driving behavior of a driver of a vehicle, the method including: receiving information pertaining to one or more loads to be transported by vehicles; determining one or more first driving behavior parameter thresholds based at least in part on a first fragility indicator of a load to be transported by the vehicle during a first portion of a route, where the first fragility indicator is determined at least in part based on the information pertaining to the one or more loads; and causing the driving behavior of the driver of the vehicle to be monitored during the first portion of the route based on the one or more first driving behavior parameter thresholds.

One general aspect includes a management server device located in the cloud for automatically monitoring driving behavior of a driver of a vehicle, the management server device including: a non-transitory computer readable storage medium to store instructions; and a processor coupled with the non-transitory computer readable storage medium to process the stored instructions to: receive information pertaining to one or more loads to be transported by vehicles; determine one or more first driving behavior parameter thresholds based at least in part on a first fragility indicator of a load to be transported by the vehicle during a first portion of a route, where the first fragility indicator is determined at least in part based on the information pertaining to the one or more loads; and cause the driving behavior of the driver of the vehicle to be monitored during the first portion of the route based on the one or more first driving behavior parameter thresholds.

One general aspect includes a non-transitory computer readable storage medium that provide instructions, which when executed by a processor of a management server device located in the cloud, cause said processor to perform operations including: receiving information pertaining to one or more loads to be transported by vehicles; determining one or more first driving behavior parameter thresholds based at least in part on a first fragility indicator of a load to be transported by a vehicle during a first portion of a route, where the first fragility indicator is determined at least in part based on the information pertaining to the one or more loads; and causing the driving behavior of a driver of the vehicle to be monitored during the first portion of the route based on the one or more first driving behavior parameter thresholds.

BRIEF DESCRIPTION OF THE DRAWINGS

The invention may best be understood by referring to the following description and accompanying drawings that are used to illustrate embodiments of the invention. In the drawings:

FIG. 3 illustrates an exemplary route scheduled for vehicle 110, in accordance with some embodiments FIG. 4A illustrates exemplary driving behavior parameters and exemplary driving behavior parameter thresholds that can be used to monitor the driving behavior of a driver, according to some embodiments.

DESCRIPTION OF EMBODIMENTS

Figure 1A:
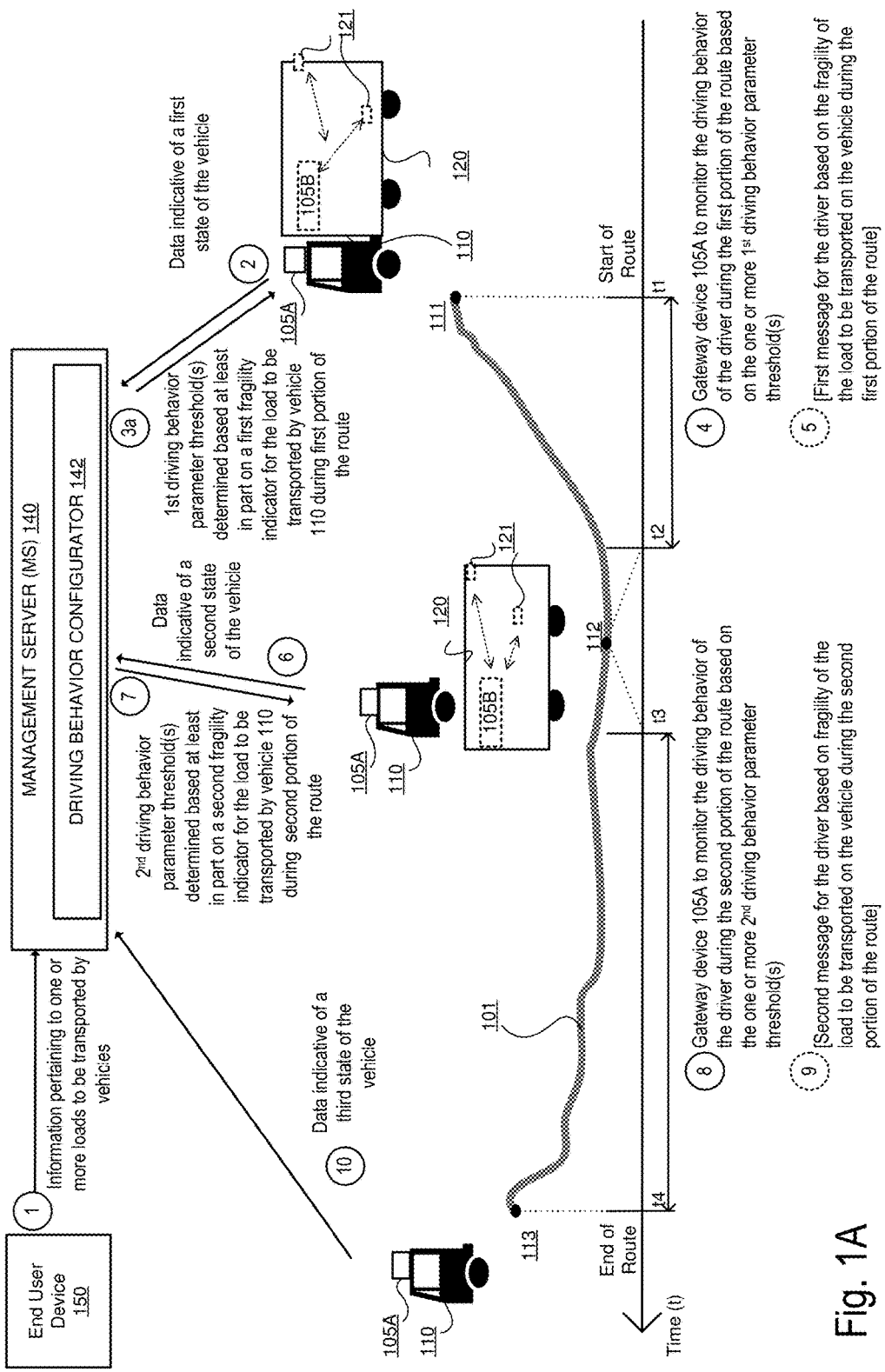
FIG. 1A illustrates a block diagram of an exemplary block diagram for monitoring driving behavior of a driver of a vehicle, in accordance with some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Throughout the following description similar reference numerals have been used to denote similar elements such as components, features of a system and/or operations performed in a system or element of the system, when applicable.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Systems and methods of automatically monitoring driving behavior of a driver of a vehicle. According to some embodiments, the system and method provide mechanisms where the behavior of the driver is monitored based on the load of the vehicle that the driver is driving. In some embodiments, the mechanisms described herein enable the monitoring of the driving behavior of a driver based on the fragility of the load transported on the vehicle. For example, a vehicle carrying a fragile shipment of glass bottles or hazardous material may need to be driven with further attention than a vehicle carrying a less fragile shipment of books. In addition, the type of material and methods used for packaging the transported goods may vary from a shipment to another affecting the fragility of a load. Additional parameters and conditions can further affect the necessity to adapt the driving behavior of a driver of a vehicle. Conventional methods of monitoring the driving behavior of a driver do not address these concerns and are not adaptable to the fragility and type of load that is transported by the vehicle.

In addition, the load may change during a particular route scheduled for a vehicle over an interval of time. This change affects the fragility of the load that is transported along the route.

The mechanisms described herein allow for a dynamic monitoring of the driving behavior of a driver of a vehicle. The monitoring is performed by taking into account the fragility of the load and dynamically adapting the thresholds that trigger warning alerts or detection of harsh driving events based on this fragility. The mechanisms further allow for a dynamic update of these triggers based on the changes that occur within a single route for a vehicle.

According to some embodiments, a method and a management server device located in the cloud, for automatically monitoring driving behavior of a driver of a vehicle are described. A management server receives information pertaining to one or more loads to be transported by vehicles. The management server determines one or more first driving behavior parameter thresholds based at least in part on a first fragility indicator of a load to be transported by the vehicle during a first portion of a route, where the first fragility indicator is determined at least in part based on the information pertaining to the one or more loads. The management server causes the driving behavior of the driver of the vehicle to be monitored during the first portion of the route based on the one or more first driving behavior parameter thresholds.

FIG. 1A illustrates a block diagram of an exemplary block diagram for monitoring driving behavior of a driver of a vehicle, in accordance with some embodiments. FIG. 1A includes a vehicle 110 and a management server 140.

The vehicle 110 can be any type of vehicle that can be used to transport and deliver goods. The vehicle 110 can be part of a fleet of vehicles operated by a fleet manager and is typically located remotely from the management server 140. The vehicle 110 can be a tractor coupled with a trailer part (e.g., trailer 120). For example, the vehicle 110 can be a tractor, a tow truck, a semi-truck, a light or heavy truck or any other type of vehicle that is operative to be coupled with and pull a trailer. Alternatively, the vehicle can be a car, a van, a bus, a specialized vehicle or any other type of vehicle used for transportation of goods.

The vehicle 110 includes a gateway device 105. The gateway device 105A may be located inside the vehicle or outside of the vehicle 110. The gateway device 105A is an electronic device and is operative to be coupled with the management server 140 through a Wide Area Network (WAN) (not illustrated). The connection to the WAN is a wireless connection (e.g., WiFi, cellular connection, etc.). In some embodiments, the gateway device 105A and the management server 140 may be subject to an intermittent connectivity with the WAN. The gateway device 105A is operative to record or obtain data related to the vehicle on which it is mounted and transmit the data to the management server 140. In some embodiments, the gateway device 105A is further operative to connect to a computing device of the vehicle 110. For example, the gateway device 105A can be coupled to the vehicle's computing device through an On-board diagnostics (OBD) port of the vehicle 110. The gateway device 105A transmits data indicative of a state of the vehicle. In some embodiments, the trailer 120 can also include a gateway device 105B that is communicatively coupled with the management server 140. In some embodiments, each of the gateway device 105A and the gateway device 105B are implemented as described in further details with reference to FIG. 9.

The management server 140 is a cloud-based server operative to receive data from one or more gateway devices (e.g., the gateway device 105). The data received from the gateway devices is used by the driving behavior configurator 142 to cause each gateway device to monitor the behavior of a driver of the vehicle on which the gateway device is mounted. As will be described in further details below, the driving behavior configurator 142 enables the monitoring of the driving behavior based on the load of the vehicle. In some embodiments, the monitoring of the driving behavior is adapted to the fragility of the load of the vehicle. The driver is enabled to adapt their driving behavior to the type of load being transported. In some embodiments, the management server 140 is implemented as described in further details with reference to FIG. 7.

The fleet management network further includes an end user device 150 that is a computing device (e.g., laptop, workstation, smartphone, palm top, mobile phone, tablet, etc.) capable of accessing network resources (e.g., it includes software such as web browsers or web applications that are capable of accessing network resources (e.g., HTTP client, FTP client, SSH client, Telnet client, etc.)). A user of the end user device 150 can connect to the management server 140 to access or provide data about the vehicles of a fleet of vehicles and/or routes that are to be scheduled for the vehicles. Through the end user device 150, a user enters information pertaining to one or more loads to be transported by vehicles. In some embodiments, the user of the end user device 150 accesses a fleet management service that is provided through the management server 140 to monitor and track the vehicles and/or the driving behavior of the drivers of the vehicles. The user of the end user device 150 can be the owner of the vehicle 110 and the gateway device 105. In some embodiments, the user is an administrator of the vehicle 110 and the gateway device 105. In other embodiments, the user is a customer of a delivery service that owns the fleet of vehicles. In other embodiments, the user can be the driver of the vehicle. The end user device 150 is operative to receive a report including information about the driving behavior of the driver of a vehicle and/or receive alerts when a driver of a vehicle caused a harsh driving event to occur.

The vehicle 110 also includes one or more wireless sensing devices 121. The wireless sensing devices (WSD) 121 are electronic devices that include one or more sensors for detecting physical events (e.g., temperature, humidity, barometric pressure, $CO_2$ concentration, acceleration, pressure, sound, movement, etc.) and recording sensor measurements in response to the detection of these physical events. The wireless sensing devices can be small electronic devices that are attachable to an object for recording sensor information related to physical events related to the object (e.g., recording changes in temperature, movement of an object (e.g., a door being closed/opened), sudden accelerations of a vehicle, etc.). The WSD 121 can then store the sensor measurements related to physical events detected over a period of time. The WSDs 121 may record sensor measurements at regular intervals of time (e.g., the WSDs 121 may detect the temperature of a room, or an object (e.g., refrigerator, food product), and record corresponding temperature measurements every N seconds or minutes). The sensor measurements are stored in a non-transitory computer readable medium of the WSDs 121. Each of the WSDs 121 is operative to be coupled to one or more gateway devices (e.g., gateway device 105) and establish a communication channel to transfer the recorded sensor measurements. In some embodiments, each of the WSDs 121 can connect to the gateway device through a wireless communication interface (e.g., Bluetooth Low Energy (BLE), WiFi). Thus, the WSDs 121 are operative to detect a gateway device and negotiate a connection to the gateway. In some embodiments, the WSDs 121 are used to measure sensor measurements indicating current values of one or more driving behavior parameter to be monitored for the vehicle during a route.

At operation 1, the management server 140 receives information pertaining to loads to be transported by vehicles. In some embodiments, the information pertaining to the loads includes for each load a fragility indicator. In these embodiments, the fragility indicator is transmitted from the end user device 150 to the management server 140. In other embodiments, the information pertaining to the load does not include the fragility indicator; instead, the fragility indicator is derived from the information pertaining to the loads by the management server 140. In some embodiments, the information pertaining to the loads may include a description of the loads (e.g., shipment of glasses, shipment of books, oil, water, etc.). The information pertaining to the loads can further include a weight of the load, a size of the load, a packing type for the load (e.g., foam noodles, air packets, etc.), a type of container in which the load is packaged (e.g., cardboard box, freight container, etc.). From some or all of this information, the fragility indicator is determined by the management server 140. In some embodiments, the management server 140 may include a set of two or more pre-set fragility indicators and the user of the end user device 150 can select for each load a corresponding fragility indicator from the set.

In some embodiments, the fragility indicator is an alpha-numerical value that is indicative of the fragility of the shipment and which affects harsh driving behavior and warning thresholds, as it will be described in further details below. In some embodiments, the fragility indicator can be assigned to a single item of the shipment or to a group of items. A load of a vehicle can include one or more items that are to be transported on the vehicle. Each of the items may have a respective fragility indicator. For example, a load of a vehicle can include boxes of books as well as boxes of glass bottles. Each type of box is associated with a different fragility indicator. When items with different fragility indicators are transported in a vehicle as part of a same load, a global fragility indicator is determined based on the various individual fragility indicators. Several methods can be used to determine the global fragility indicators. For example, the fragility indicator of the item that is the most fragile when compared to the other items can be selected as the global fragility indicator. The set of fragility indicators that can be assigned to a load or an item of the load includes two or more indicators varying from a first indicator associated with the most fragile items to a last indicator associated with the most durable items. For example, hazardous material (such as flammable liquids or gazes) can be associated with a "very fragile" fragility indicator, while an empty vehicle or trailer can be associated with a "no load" fragility indicator. Several intermediary fragility indicators can be defined to be associated with items of various fragility levels and which will result in a variable degree of monitoring of the behavior of a driver of the vehicle transporting the load. When determining a scale of fragility indicators for different items to be transported, a type of packaging can be taken into consideration such that an item of a same type (e.g., glass bottles) may have two different fragility indicator that can be assigned depending on the type of packaging that is used.

The set of fragility indicators can be set by an administrator of a fleet or by the service used for offering monitoring of the driving behavior of drivers.

Referring to FIG. 1, a route 101 is scheduled for vehicle 110. Several mechanisms can be used for scheduling the route 101 for the vehicle 110 and the driver of this vehicle. In one embodiment, a dispatcher may manually select, through a user interface of the management server 140, vehicle 110 from a list of vehicles of a fleet, a driver from a list of drivers of the fleet, and a set of one or more locations to be assigned for the vehicle and driver for a particular interval of time. In another embodiment, part or all of the dispatch mechanism can be performed automatically by the management server 140. For example, a user can enter a list of locations, loads, drivers and vehicles, and the management server 140 may automatically determine an optimal route for each driver and vehicle based on real time data available for each driver and vehicle. Various other dispatch mechanisms can be used without departing from the scope of the present invention.

FIG. 3 illustrates an exemplary route scheduled for vehicle 110, in accordance with some embodiments. Table 300 illustrates an example of information related to the route 101 that is available at the management server 140. In some embodiments, the information may be available at the management server via one or more databases and may not be represented as the table 300. The route information includes one or more geographical locations for the route. The geographical locations include start of route location 111, stop location 112, and end of route location 113. The route 101 may also include an expected time for the vehicle to reach each location. The route information includes an identification of the vehicle that is assigned to the route (vehicle 110). The identification of the vehicle can be any alphanumerical value that uniquely identifies the vehicle among other vehicles of a fleet (e.g., vehicle identification number (VIN), an identification assigned to the vehicle when it is added to the fleet, etc.). The route information includes an indication of whether a trailer is attached to the vehicle or not. In some embodiments, the indication may include an identification of the trailer (trailer 120). The identification of the vehicle can be an alphanumerical value that uniquely identifies the vehicle among other vehicles of a fleet (e.g., vehicle identification number (VIN), an identification assigned to the vehicle when it is added to the fleet, etc.). In other embodiments, the indication can be a Boolean parameter, where a first value indicates that a trailer is attached and the other one indicates that a trailer is not attached. In the illustrated example, a trailer is attached to the vehicle 110 during a first portion of the route 101 and no trailer is attached to the vehicle 110 during the second portion of the route 101.

The route information further includes an indication of whether a load is to be transported by the vehicle. In the illustrated example, a load is to be transported during the first portion of the route 101 and no load is to be transported during the second portion of the route 101. The route information further includes a fragility indicator for the load to be transported in each portion of the route 101. In the first portion of the route 101, from start of route location 111 to stop location 112, the fragility indicator is F1 indicating that the load is fragile. In the second portion of the route 101, from stop location 112 to end of route location 113, the fragility indicator is F2 indicating that there is no load transported in the vehicle.

The vehicle 110 departs from the first location 111, at time t1 and is driven through a first portion of a route 101 towards a first destination location 112. The vehicle 110 arrives at the first destination location 112, at time t2, and leaves this location at time t3. The vehicle 110 is driven on a second portion of the route 101 between time t3 and time t4 and reaches the second destination location 113 at time t4, at which point it has completed the route 101. In the illustrated example, at time t1 the vehicle pulls the trailer 120 until the first destination location 112 is reached. At this location 112, the trailer 120 is unplugged from the vehicle 110 and the vehicle 110 is driven to the second destination 113 without any load. Thus, during the course of a single route scheduled for the vehicle 110, its load changes during one of the scheduled stops. Each of the first location 111, second location 112, and third location 113 can be any location scheduled as a stop for the vehicle 110 along a route 101. Non-limiting examples of locations can be a store, a warehouse, a manufacture, a restaurant, a residence, a school, a trailer park, a hospital, etc. The types of locations are intended to be exemplary only, and other types of locations can be contemplated. While FIG. 1A illustrates a route including three locations only, a route scheduled for a vehicle can include any number of stops and locations.

While the illustrated example, shows a vehicle that starts a route with a trailer and drops the trailer at a given location prior to pursuing the route, resulting in a change in the load of the vehicle and its fragility, in other embodiments, the type of load and its fragility may change without the need for the trailer to be dropped. For example, the load can be unloaded at location 112 and a different load can be loaded at this location to be transported towards location 113. In another example, some items from the load of the vehicle 110 can be offloaded or replaced while other items from the load remain the same. Several other examples of changes to the load can be contemplated without departing from the scope of the present invention.

Referring back to FIG. 1A, based on the information pertaining to the loads received at operation 1 and the route information for route 101, the management server 140 determines driving behavior parameter thresholds for each portion of the route. In one embodiment, the management server 140 receives from the gateway device 105A, at operation 2, data indicative of a first state of the vehicle. The data indicative of the first state of the vehicle may include location readings for the vehicle, speed measures for the vehicle, an identification of the driver of the vehicle, image data recorded at the vehicle, and/or additional sensor measurements recorded by the WSDs 121, the vehicle's computing device or the gateway device 105B. Upon receipt of the data indicative of the first state of the vehicle, the management server 140 determines that the vehicle has started or is about to start the first portion of route 101. The management server 140 transmits, at operation 3a, a set of one or more first driving behavior parameter thresholds. The first driving behavior parameter threshold(s) are determined based on a first fragility indicator for the load to be transported by the vehicle 110 during the first portion of the route 101. Upon receipt of the first driving behavior parameter thresholds, the gateway device 105A is caused to monitor the driving behavior of the driver during the first portion of the route 101 based on these thresholds. The first driving behavior parameter threshold(s) enable the driving behavior of the driver to be monitored (operation 4) during this first portion of the route based on the fragility of the load that is transported in this portion. For example, with reference to FIG. 3, when the fragility of the load for the first portion is determined to be "fragile", the thresholds are adapted to this fragility and the driver's behavior is monitored accordingly.

The driving behavior of the driver is monitored according to the first driving behavior parameter thresholds during the entire first portion of the route 101 until a change in the fragility of the load occurs. In some embodiments, in addition to monitoring the driving behavior of the driver (operation 4), the gateway device 105A may present a first message (operation 5) for the driver that is adapted based on the fragility of the load that is transported. For example, the first messages may include a description of the type of the vehicle that is being driven, a description of the driving behavior parameter(s) monitored, and a qualitative description of the first driving behavior parameter threshold(s) received. As a non-limiting example, the first message can be an audio recording or a short video message. The first message can include the following exemplary information: "This is a Heavy Duty Vehicle", "This is a Fragile Shipment"; "Acceleration and Temperature are being monitored to detect Harsh Events to this Heavy Duty Vehicle"; "This Heavy Duty Vehicle is more sensitive to Acceleration and Temperature than other vehicles. Please use caution when making changes to this device's Acceleration or Temperature." The first message enables the driver to obtain relevant information related to the driving behavior being monitored. In other embodiments, additional or less information can be included in the first message. In other embodiments, no message is presented to the driver.

The management server 140 receives from the gateway device 105A, at operation 6, data indicative of a second state of the vehicle. The data indicative of the second state of the vehicle may include location readings for the vehicle, speed measures for the vehicle, an identification of the driver of the vehicle, image data recorded at the vehicle, and/or additional sensor measurements recorded by the WSDs 121, the vehicle's computing device or the gateway device 105B. Upon receipt of the data indicative of the second state of the vehicle, the management server 140 determines that the vehicle has completed the first portion of route 101 and that a second portion of the route is to be initiated. The management server 140 transmits, at operation 7, second driving behavior parameter thresholds. The second driving behavior parameter thresholds are determined based on a second fragility indicator for the load to be transported by the vehicle 110 during the second portion of the route 101. Upon receipt of the second driving behavior parameter thresholds, the gateway device 105A is caused to monitor (operation 8) the driving behavior of the driver during the second portion of the route 101 based on these thresholds. The second driving behavior parameter thresholds enable the driving behavior of the driver to be monitored during this second portion of the route based on the fragility of the load that is transported in this portion. For example, with reference to FIG. 3, when the fragility of the load for the second portion is determined to be "no load", the thresholds are adapted to this fragility and the driver's behavior is monitored accordingly. The driving behavior of the driver is monitored according to the second driving behavior parameter thresholds during the entire second portion of the route 101 until a change in the fragility of the load that occurs. In some embodiments, in addition to monitoring the driving behavior of the driver, the gateway device 105A may present a second message for the driver that is adapted based on the fragility of the load that is transported. For example, the second messages may include a description of the type of the vehicle that is being driven, a description of the driving behavior parameter(s) monitored, and a qualitative description of the second driving behavior parameter threshold(s) received. As a non-limiting example, the second message can be an audio recording or a short video message. The second message can include the following exemplary information: "This is a Heavy Duty Vehicle", "there is no trailer attached" "Acceleration and Temperature are being monitored to detect Harsh Events to this Heavy Duty Vehicle." The second message enables the driver to obtain relevant information related to the driving behavior being monitored. In other embodiments, additional or less information can be included in the second message. In other embodiments, no message is presented to the driver. At operation 10, the management server 140 received data indicative of a third state of the vehicle. Based on this data, the management server 140 determines that the vehicle has now stopped and completed the scheduled route 101. The monitoring of the driver's behavior may stop.

Figure 1B:
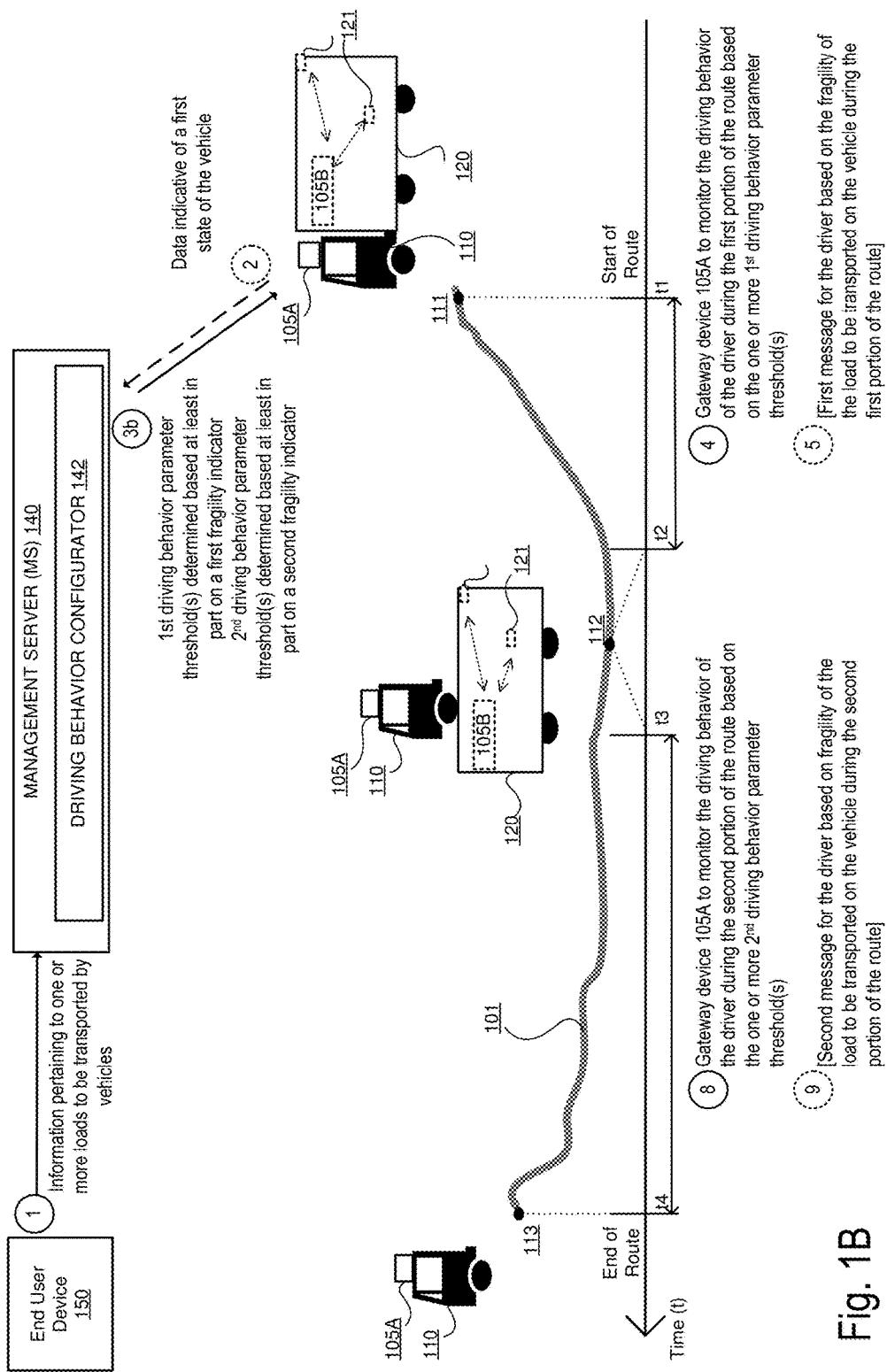
FIG. 1B illustrates a block diagram of an exemplary embodiment for determining the first driving behavior parameter thresholds and the second driving behavior parameter thresholds independently of the receipt of data indicative of the state of a vehicle, in accordance with some embodiments.

FIG. 1B illustrate an alternative embodiment, where the management server 140 determines the first driving behavior parameter thresholds and the second driving behavior parameter thresholds and transmits the two sets to the gateway device 105A of the vehicle 110 independently of the receipt of the data indicative of the state of the vehicle. In this embodiment, the first and the second driving behavior parameter thresholds that are to be used for each portion of the route 101 are transmitted at the beginning of the route to the gateway device. The gateway device 105A may then determine to use the first set of thresholds during time t1 to t2 for the first portion of the route, upon determining that this first portion has started. The gateway device 105A determines to use the second set of driving behavior parameter thresholds during time t3 to t4 for the second portion of the route, upon determining that the second portion of the route has started or that he first portion of the route has ended. In some embodiments, the gateway device may present a first message for the driver upon determining that the first set of driving behavior parameter thresholds is used for monitoring the driving behavior. The gateway device 105A may present a second message for the driver upon determining that the second set of driving behavior parameter thresholds is used for monitoring the driving behavior.

The operations of FIGS. 2A-D will be described with reference to the block diagram of FIGS. 1A-B, FIG. 3, FIGS. 4A-B. However, it should be understood that the operations of FIGS. 2A-D can be performed by embodiments of the invention other than those discussed with reference to the other figures, and the embodiments of the invention discussed with reference to these other figures can perform operations different from those discussed with reference to the flow diagrams.

Figure 2A:
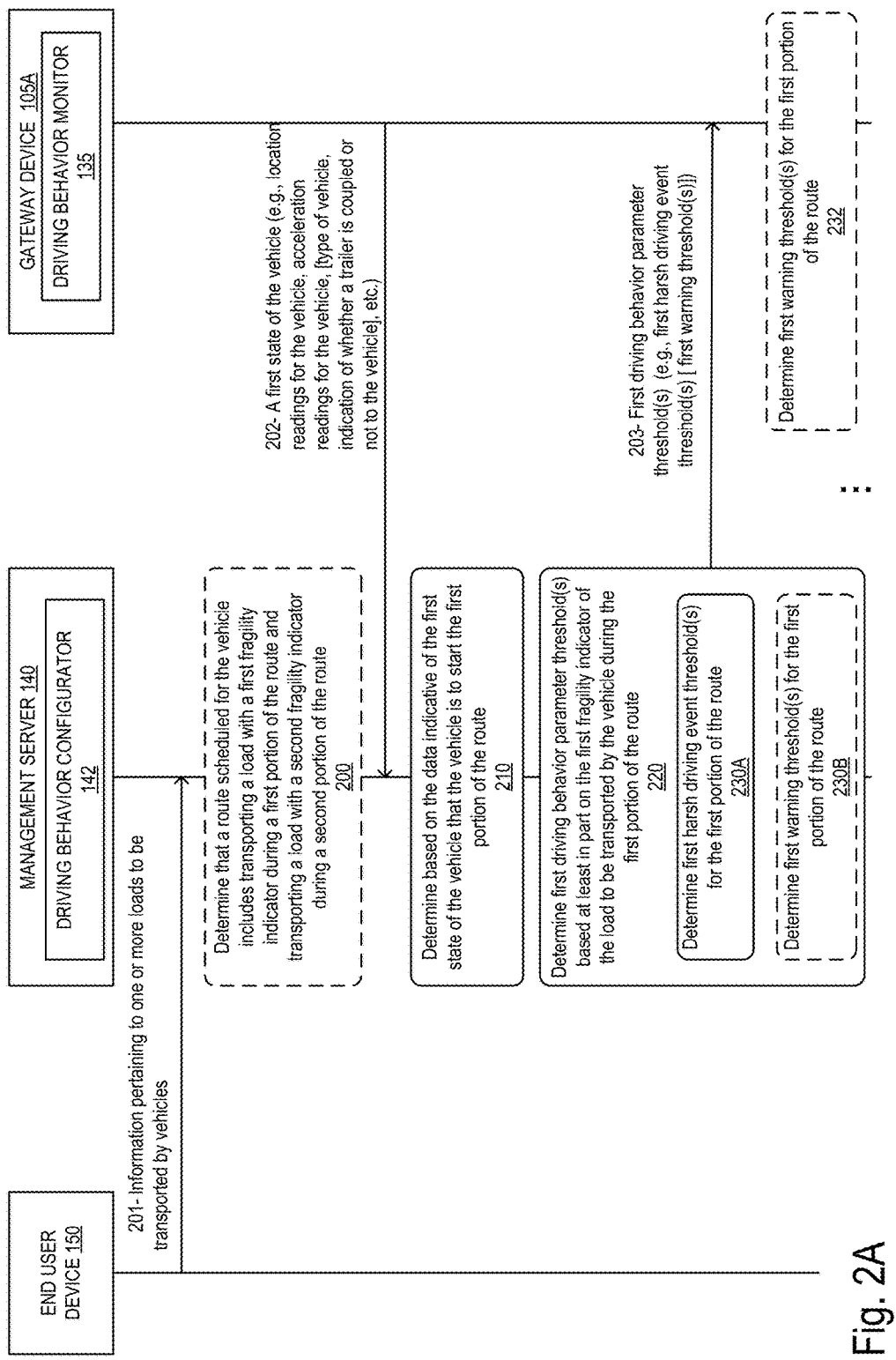
FIG. 2A illustrates a detailed transactional diagram of exemplary operations for determining first driving behavior parameter thresholds for monitoring the driving behavior of a driver of a vehicle based on the fragility of the load to be transported in a first portion of a route, in accordance with some embodiments.

FIG. 2A illustrates a detailed transactional diagram of exemplary operations for determining first driving behavior parameter thresholds for monitoring the driving behavior of a driver of a vehicle based on the fragility of the load to be transported in a first portion of a route, in accordance with some embodiments. At operation 201, the end user device 150 transmits information pertaining to one or more loads to be transported by vehicles. Based on the information pertaining to the loads received, the management server 140 determines, at operation 200, that a route scheduled for the vehicle includes transporting a load with a first fragility indicator (e.g., F1) during a first portion of the route and transporting a load with a second fragility indicator (e.g., F2) during a second portion of the route. At operation 202, the gateway device 105A transmits a first state of the vehicle 110. The first state of the vehicle includes one or more location readings for the vehicle. The location readings received indicate that the vehicle is in the start of the route location 111. Location readings are sensor measurements recorded by a location sensor. The location sensor can be located within or outside of the gateway device 105A. For example, the location sensor can be a Global Positioning System (GPS) sensor and the location readings are GPS coordinates. The location readings include one or more readings indicating the location of the vehicle at one or more times. In some embodiments, each location reading can include a longitude, latitude and an associated timestamp. The timestamp can indicate the time at which the latitude and longitude were recorded by the location sensor; alternatively the timestamp can indicate the time at which the latitude, longitude are transmitted from the gateway device or received by the management server 140.

In some embodiments, the first state of the vehicle further includes one or more acceleration readings for the vehicle. The acceleration measures are recorded by an accelerometer that can be located within or outside of the gateway device 105A. The acceleration measures include one or more measures indicating the acceleration of the vehicle at different times. In some embodiments, each acceleration measure is associated with a timestamp. The timestamp can indicate the time at which the acceleration is recorded by the accelerometer; alternatively, the timestamp can indicate the time at which the acceleration measure is transmitted from the gateway device or received by the management server 140.

In some embodiments, the first state of the vehicle can also include additional information about the vehicle such as a type of vehicle, indication of whether a trailer is coupled or not to the vehicle, an identification of the vehicle, image data recorded at the vehicle, and/or additional sensor measurements recorded by the WSDs 121, the vehicle's computing device or the gateway device 105B. At operation 210, the management server 140 determines based on the data indicative of the first state of the vehicle that the vehicle is to start the first portion of the route. For example, the management server 140 may determine based on the location readings received that the vehicle is located at a location that is identified as a start of the route 101. The management server 140 may further determine based on the acceleration measures that the vehicle has started moving.

Flow then moves to operation 220, at which the management server 140 determines a set of first driving behavior parameter threshold(s) based at least in part on the first fragility indicator of the load to be transported by the vehicle during the first portion of the route 101. The driving behavior parameter(s) are measures of physical events that occur in the vehicle as a result of actions performed by the driver while driving. These parameters when monitored give an indication of the behavior of the driver. In some embodiments, the management server 140 determines, at operation 230A, first harsh driving event threshold(s) for the first portion of the route 101. A harsh driving event threshold defined for a parameter enables the detection of the occurrence of a harsh driving event caused by an action performed by the driver while driving the vehicle. The harsh driving events can be considered unsafe events that need to be recorded and/or reported to an administrator, a supervisor or an enforcement authority. For example, a harsh driving event can correspond to a driver driving above an allowed speed limit, braking suddenly or harshly, taking a sharp turn, suddenly accelerating, etc. Harsh driving events can be detected by monitoring one or more driving behavior parameters that indicate corresponding events that occur in the vehicle (e.g., the magnitude of the acceleration force of the vehicle resulting from the driver braking (referred to herein below as the acceleration force magnitude (braking)), a distance between the vehicle and the nearest car in front of the vehicle (the follow distance), the temperature of the engine, and the magnitude of the acceleration force of the vehicle resulting from a turn (i.e., acceleration force magnitude (turning)). Other types of parameters can be monitored.

FIG. 4A illustrates exemplary driving behavior parameters and exemplary driving behavior parameter thresholds that can be used to monitor the driving behavior of a driver, according to some embodiments. In the illustrated example, the driving behavior parameters include the magnitude of the acceleration force of the vehicle resulting from a braking event, a distance between the vehicle and the nearest car in front of the vehicle (the follow distance), the temperature of the engine, and the magnitude of the acceleration force of the vehicle resulting from a turn. In some embodiments, some or all of these parameters can be used to monitor the behavior of the driver of a vehicle.

In the example of FIG. 4A, for each type of driving behavior parameter (e.g., acceleration force magnitude (braking), follow distance, engine temperature, acceleration force magnitude (turning)) and fragility indicator (F1 "fragile", F2 "no load," F3 "durable") a threshold is set. In some embodiments, in addition to setting a threshold for each parameter and corresponding fragility indicator, a threshold is set for each type of driving behavior parameter and type of vehicle. In these embodiments, in addition to taking into account a fragility of the load that is being transported in the vehicle to determine the driving behavior parameter thresholds, the management server 140 determines the thresholds based on the vehicle's type as well as the fragility indicator for the load. Thus, while the vehicle's type does not change during the route 101, the fragility indicator may be updated depending on the load that is being transported during a portion of the load. This allows for a monitoring of a driver's behavior that is adaptable based on the fragility of the load.

Referring back to FIG. 2A, in some embodiments, the operation 230A of determining a set of first harsh driving event thresholds can include determining based on the table 401 a corresponding threshold for each one of the parameters ((e.g., acceleration force magnitude (braking), follow distance, engine temperature, acceleration force magnitude (turning)) based on the fragility of the load and optionally based on the vehicle's type. In some embodiments, when only the fragility of the load is considered the value associated with the fragility (F1) of the load for the first portion of the route 101 is output (e.g., value 0.6 g for the acceleration force magnitude (braking), value 60 m for the follow distance, etc.). In other embodiments, when the thresholds are determined based on both the fragility indicator and the vehicle's type, an optimization operation can be performed to determine the appropriate value to select for each parameter. For example, for determining the harsh driving event threshold to be used for the acceleration force magnitude (braking), the minimum between the value selected based on the vehicle's type (e.g., here 0.8 g for the vehicle 110, which is of type 3 (heavy duty vehicle)) and the value selected based on the fragility indicator of the load transported during the first portion of the road (e.g., here 0.6 g for the vehicle 110) is selected. The value 0.6 g is selected and used as a harsh driving event threshold for the acceleration force magnitude (braking) parameter. In some embodiments, a different optimization operation can be performed based on the type of parameter that is evaluated (e.g., maximum, minimum are non-limiting examples of these operations).

Different operations can be used to define the various threshold values (e.g., the values used to populate the table 401 of FIG. 4A) to be assigned to each fragility indicator and/or type of vehicle. For example, each threshold value can be preselected based on driving standards set by the auto industry, enforcement authorities, the fleet administrator, insurance industry, or any other entity. Data publicly available that provides industry standards including the various driving behavior parameter thresholds can be accessed and used to populate the table 401.

In another example, the threshold values can be set based on experimental observations of one or more vehicles of the fleets. In this example, experiments involving manually inducing known harsh events and observing the values that cause the harsh event are performed. In some embodiments, a statistical analysis of the data obtained can further be used to define the threshold values and populate the table 401. In other embodiments, classification methods can be used to identify harsh events and define corresponding harsh driving event thresholds.

Referring back to FIG. 2A, in some embodiments, in addition to determining harsh driving event thresholds, the management server 140 may determine first warning threshold(s) for the first portion of the route. The first warning thresholds are intermediary thresholds which when reached for a given driving behavior parameter cause an alert or warning to be triggered for the driver. As opposed to harsh driving event thresholds, these warning thresholds are not indicative that a harsh event or unsafe event has occurred. Instead, these thresholds are used to warn the driver prior to the occurrence of a harsh event. In some embodiments, these thresholds can be used as part of a coaching or learning process for the driver. The alert can be presented to the driver immediately following the occurrence of the driving behavior that caused a measure of one or more the parameters to reach or exceed the corresponding warning threshold. The alert informs the driver that their behavior if not modified can cause the occurrence of a harsh driving event. In some embodiments, the actions that caused the warning thresholds to be reached or exceeded may be recorded and may be presented as part of a driving performance report for the driver along route 101. In other embodiments, these actions are not recorded and only the alert is transmitted to the driver. The warning thresholds are determined based on the fragility of the load. In some embodiments, the vehicle's type is also taken into consideration. In additional embodiments, additional conditions can be taken into account when determining the warning thresholds. For example, weather conditions, time of day (night or day), information about the driving history of the driver (e.g., hours driven without a break, history of harsh events, etc.), road conditions, vehicle's speed, traffic data, history of harsh events for the vehicle, history of harsh events for similar vehicles, vehicle inspection report of the vehicle, can be used to dynamically update and/or modify the warning thresholds such that the driver is warned of potentially unsafe driving behavior based on current conditions of the vehicle, the weather and the environment.

Figure 4B:
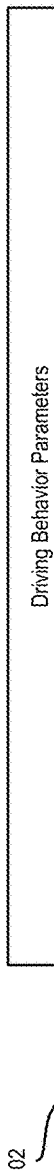
FIG. 4B illustrates exemplary driving behavior parameters and exemplary warning thresholds that can be used to monitor the driving behavior of a driver, according to some embodiments.

FIG. 4B illustrates exemplary driving behavior parameters and exemplary warning thresholds that can be used to monitor the driving behavior of a driver, according to some embodiments. In the illustrated example, the driving behavior parameters include the magnitude of the acceleration force of the vehicle resulting from a braking event, a distance between the vehicle and the nearest car in front of the vehicle (the follow distance), the temperature of the engine, and the magnitude of the acceleration force of the vehicle resulting from a turn. In some embodiments, some or all of these parameters can be used to monitor the behavior of the driver of a vehicle.

In the example of FIG. 4B, for each type of driving behavior parameter (e.g., acceleration force magnitude (braking), follow distance, engine temperature, acceleration force magnitude (turning)) and fragility indicator (F1 "fragile", F2 "no load," F3 "durable") a warning threshold is set. In some embodiments, in addition to setting a threshold for each parameter and corresponding fragility indicator, a threshold is set for each type of driving behavior parameter and type of vehicle. In these embodiments, in addition to taking into account a fragility of the load that is being transported in the vehicle to determine the driving behavior parameter thresholds, the management server 140 determines the thresholds based on the vehicle's type as well as the fragility indicator for the load. Thus, while the vehicle's type does not change during the route 101, the fragility indicator may be updated depending on the load that is being transported during a portion of the load. This allows for a monitoring of a driver's behavior that is adaptable based on the fragility of the load.

Referring back to FIG. 2A, in some embodiments, the operation 230B of determining a set of first warning thresholds can include determining based on the table 402 a corresponding threshold for each one of the parameters ((e.g., acceleration force magnitude (braking), follow distance, engine temperature, acceleration force magnitude (turning)) based on the fragility of the load and optionally based on the vehicle's type. In some embodiments, when only the fragility of the load is considered the value associated with the fragility (F1) of the portion of the first portion of the route 101 is output (e.g., value 0.5 g for the acceleration force magnitude (braking), value 54 m for the follow distance, etc.). In other embodiments, when the thresholds are determined based on both the fragility indicator and the vehicle's type, an optimization operation can be performed to determine the appropriate value to select for each parameter. For example, for determining the warning threshold to be used for the acceleration force magnitude (braking), the minimum between the value selected based on the vehicle's type (e.g., here 0.7 g for the vehicle 110, which is of type 3 (heavy duty vehicle)) and the value selected based on the fragility indicator of the load transported during the first portion of the road (e.g., here 0.5 g for the vehicle 110) is selected. The value 0.5 g is selected and used as a warning threshold for the acceleration force magnitude (braking) parameter. In some embodiments, a different optimization operation can be performed based on the type of parameter that is evaluated (e.g., maximum, minimum are non-limiting examples of these operations).

Different mechanisms can be used to determine the various warning threshold values associated for each pair of driving behavior parameter and fragility indicator. For example, the warning threshold values can be dynamically determined based on the harsh driving event threshold. In one example, a warning threshold is determined as a percentage of the harsh driving event threshold (e.g., 90%, 85%, etc.). In another example, the warning threshold can be determined based on the harsh driving event threshold and one or more additional conditions such as weather conditions, road conditions, condition of the vehicle, the driver's driving history, etc. For example, the warning thresholds can be incremented or decremented based on predefined values for each condition. In other embodiments, a table (as illustrated in FIG. 4B) can be predetermined. In some embodiments, instead of being determined at the management server 140, the warning thresholds can be determined at operation 232, by the gateway device 105A. For example, the gateway device 105A may determine the warning thresholds based on the received harsh driving event thresholds.

Figure 2B:
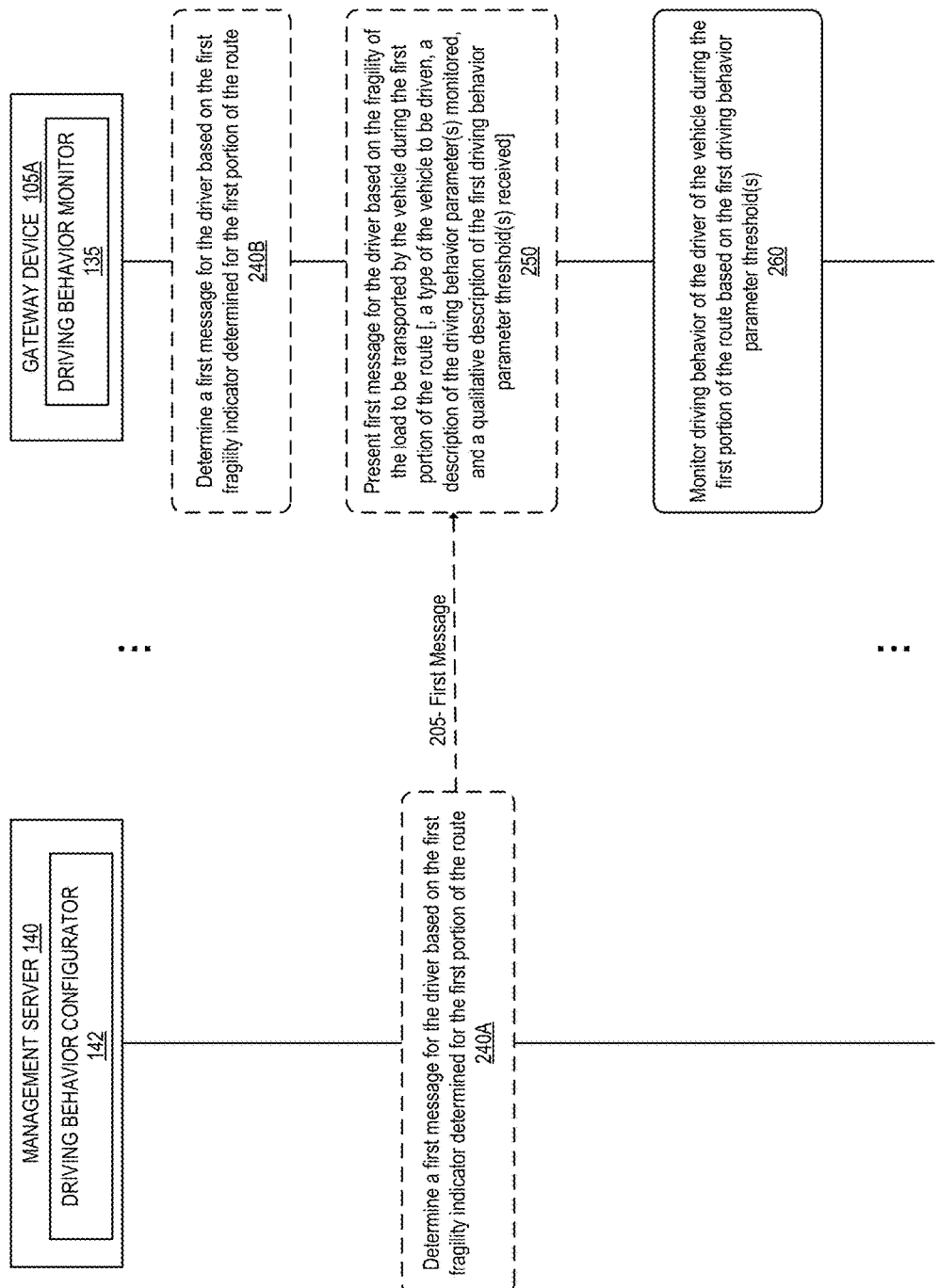
FIG. 2B illustrates a detailed transactional diagram of exemplary operations for monitoring the driving behavior of a driver of a vehicle during a first portion of a route, in accordance with some embodiments.

Referring back to FIG. 2A, at operation 203, the management server 140 transmits the first driving behavior parameter thresholds to the gateway device 105A. The thresholds include harsh driving behavior thresholds for the first portion of the route 101. In some embodiments, they also include first warning thresholds for the first portion of the route 101. FIG. 2B illustrates a detailed transactional diagram of exemplary operations for monitoring the driving behavior of a driver of a vehicle during a first portion of a route, in accordance with some embodiments. In response to receiving the first driving behavior parameter thresholds from the management server 140, the gateway device 105A monitors, operation 260, driving behavior of the driver of the vehicle during the first portion of the route based on these thresholds. Thus, the driver is caused to adapt their behavior based on the fragility of the load of the vehicle during the first portion of the route 101.

In some embodiments, in addition to transmitting the driving behavior parameter thresholds, the management server 140 determines at operation 240A a first message (205) for the driver based on the first fragility indicator for the first portion of the route 101. The first message is adapted based on the fragility of the load that is transported by the vehicle. For example, the first messages may include a description of the type of the vehicle that is being driven, a description of the driving behavior parameter(s) monitored, and a qualitative description of the first driving behavior parameter threshold(s) received. As a non-limiting example, the first message can be an audio recording or a short video message. The first message can include the following exemplary information: "This is a Heavy Duty Vehicle", "This is a Fragile Shipment"; "Acceleration and Temperature are being monitored to detect Harsh Events to this Heavy Duty Vehicle"; "This Heavy Duty Vehicle is more sensitive to Acceleration and Temperature than other vehicles. Please use caution when making changes to this device's Acceleration or Temperature." The gateway device 105A may present the first message (operation 250) for the driver. The first message enables the driver to obtain relevant information related to the driving behavior being monitored. In other embodiments, additional or less information can be included in the first message. In some embodiments, instead of being determined by the management server 140, the first message can be determined by the gateway device 105A. In one example, the gateway device 105A may be configured with several pre-recorded messages and may select one of the pre-recorded messages based on the fragility indicator determined for the first portion of the route 101.

Figure 2C:
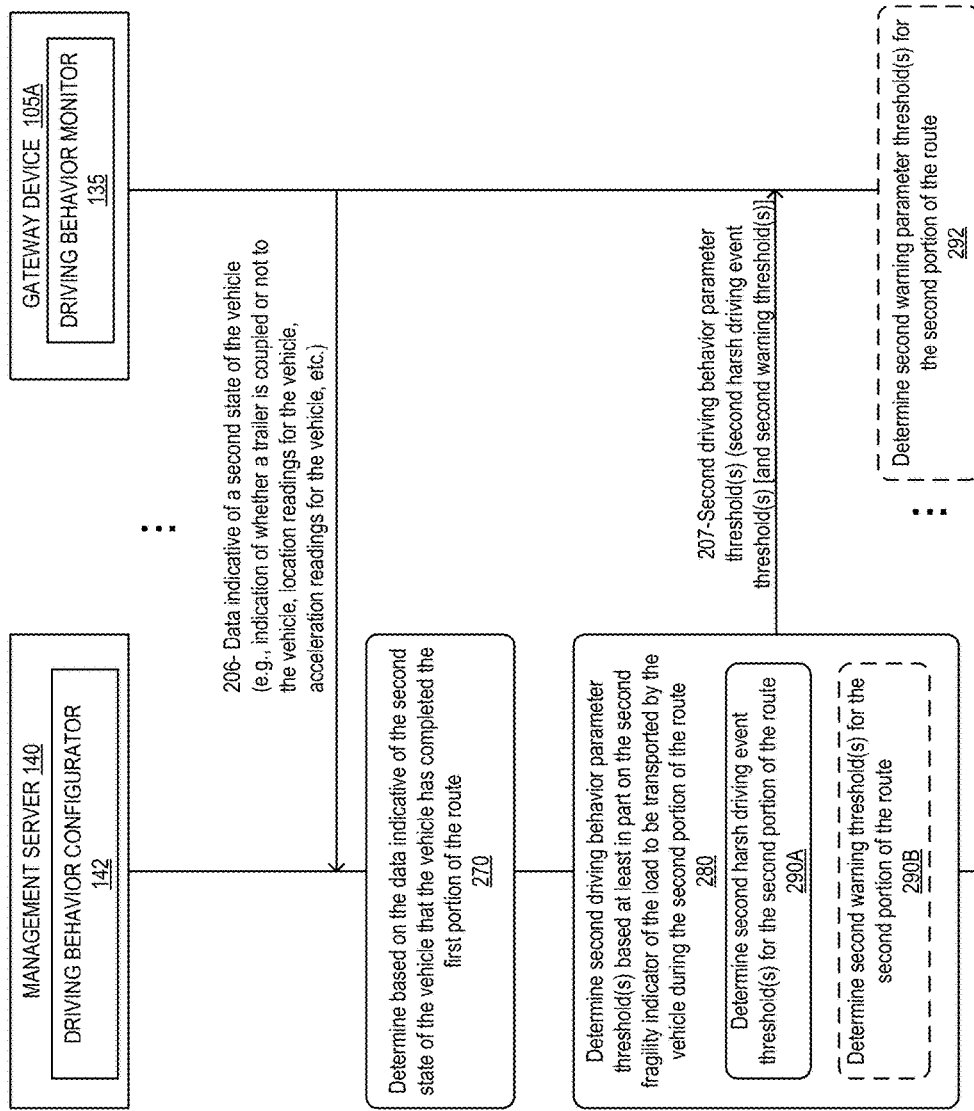
FIG. 2C illustrates a detailed transactional diagram of exemplary operations for determining second driving behavior parameter thresholds for monitoring the driving behavior of a driver of a vehicle based on the fragility of the load to be transported in a second portion of a route, in accordance with some embodiments.

FIG. 2C illustrates a detailed transactional diagram of exemplary operations for determining second driving behavior parameter thresholds for monitoring the driving behavior of a driver of a vehicle based on the fragility of the load to be transported in a second portion of a route, in accordance with some embodiments. At operation 206, the gateway device 105A transmits a second state of the vehicle 110. The second state of the vehicle includes one or more location readings for the vehicle. The location readings indicate that the vehicle has reached the first destination location 112. In some embodiments, the second state of the vehicle further includes one or more acceleration readings for the vehicle. In some embodiments, the second state of the vehicle can also include additional information about the vehicle such as a type of vehicle, indication of whether a trailer is coupled or not to the vehicle, an identification of the vehicle, image data recorded at the vehicle, and/or additional sensor measurements recorded by the WSDs 121, the vehicle's computing device or the gateway device 105B.

At operation 270, the management server 140 determines based on the data indicative of the second state of the vehicle that the vehicle is to start the second portion of the route. For example, the management server 140 may determine based on the location readings received that the vehicle is located at location 112. The management server 140 may further determine based on the acceleration measures that the vehicle has stopped.

Flow then moves to operation 280, at which the management server 140 determines a set of second driving behavior parameter threshold(s) based at least in part on the second fragility indicator of the load to be transported by the vehicle during the second portion of the route 101. In some embodiments, the management server 140 determines, at operation 290A, first harsh driving event threshold(s) for the second portion of the route 101.

Referring back to FIG. 4A, the change in the fragility indicator associated with the load of the vehicle 110 for the second portion of the route 101 causes a change in the driving behavior parameter thresholds. Thus, while the vehicle's type does not change during the route 101, the fragility indicator may be updated depending on the load that is being transported during a portion of the load. This allows for a monitoring of a driver's behavior that is adaptable based on the fragility of the load.

Referring back to FIG. 2C, in some embodiments, the operation 290A of determining a set of second harsh driving event thresholds can include determining based on the table 401 a corresponding threshold for each one of the parameters ((e.g., acceleration force magnitude (braking), follow distance, engine temperature, acceleration force magnitude (turning)) based on the fragility of the load and optionally based on the vehicle's type. In some embodiments, when only the fragility of the load is considered the value associated with the fragility (F2) of the load for the second portion of the route 101 is output (e.g., value 1.4 g for the acceleration force magnitude (braking), value 15 m for the follow distance, etc.). In other embodiments, when the thresholds are determined based on both the fragility indicator and the vehicle's type, an optimization operation can be performed to determine the appropriate value to select for each parameter. For example, for determining the harsh driving event threshold to be used for the acceleration force magnitude (braking), the minimum between the value selected based on the vehicle's type (e.g., here 0.8 g for the vehicle 110, which is of type 3 (heavy duty vehicle)) and the value selected based on the fragility indicator of the load transported during the second portion of the road (e.g., here 1.4 g for the vehicle 110) is selected. The value 0.8 g is selected and used as a harsh driving event threshold for the acceleration force magnitude (braking) parameter. In some embodiments, a different optimization operation can be performed based on the type of parameter that is evaluated (e.g., maximum, minimum are non-limiting examples of these operations). As illustrated, the change of the fragility indicator from F1 (fragile) in the first portion of the route 101 to F2 (no load) in the second portion of the route causes the driving behavior parameter thresholds to be modified and adapted for each portion of the route based on the fragility of the load transported.

Referring back to FIG. 2C, in some embodiments, in addition to determining harsh driving event thresholds, the management server 140 may determine second warning threshold(s) for the second portion of the route. The second warning thresholds are intermediary thresholds which when reached for a given driving behavior parameter cause an alert or warning to be triggered for the driver. As opposed to harsh driving event thresholds, these warning thresholds are not indicative that a harsh event or unsafe event has occurred. Instead, these thresholds are used to warn the driver prior to the occurrence of a harsh event. In some embodiments, these thresholds can be used as part of a coaching or learning process for the driver. The alert can be presented to the driver immediately following the occurrence of the driving behavior that caused a measure of one or more the parameters to reach or exceed the corresponding warning threshold. The alert informs the driver that their behavior if not modified can cause the occurrence of a harsh driving event. In some embodiments, the actions that caused the warning thresholds to be reached or exceeded may be recorded and may be presented as part of a driving performance report for the driver along route 101. In other embodiments, these actions are not recorded and only the alert is transmitted to the driver. The warning thresholds are determined based on the fragility of the load. In some embodiments, the vehicle's type is also taken into consideration. In additional embodiments, additional conditions can be taken into account when determining the warning thresholds. For example, weather conditions, time of day (night or day), information about the driving history of the driver (e.g., hours driven without a break, history of harsh events, etc.), road conditions, vehicle's speed, traffic data, history of harsh events for the vehicle, history of harsh events for similar vehicles, vehicle inspection report of the vehicle, can be used to dynamically update and/or modify the warning thresholds such that the driver is warned of potentially unsafe driving behavior based on current conditions of the vehicle, the weather and the environment.

FIG. 4B illustrates exemplary driving behavior parameters and exemplary warning thresholds that can be used to monitor the driving behavior of a driver during the first portion or the second portion of a route 101, according to some embodiments. In the illustrated example, the driving behavior parameters include the magnitude of the acceleration force of the vehicle resulting from a braking event, a distance between the vehicle and the nearest car in front of the vehicle (the follow distance), the temperature of the engine, and the magnitude of the acceleration force of the vehicle resulting from a turn. In some embodiments, some or all of these parameters can be used to monitor the behavior of the driver of a vehicle. Referring back to FIG. 2C, in some embodiments, the operation 290B of determining a set of second warning thresholds can include determining based on the table 402 a corresponding threshold for each one of the parameters ((e.g., acceleration force magnitude (braking), follow distance, engine temperature, acceleration force magnitude (turning)) based on the fragility of the load and optionally based on the vehicle's type. In some embodiments, when only the fragility of the load is considered the value associated with the fragility (F2) of the portion of the second portion of the route 101 is output (e.g., value 1.3 g for the acceleration force magnitude (braking), value 13.5 m for the follow distance, etc.). In other embodiments, when the thresholds are determined based on both the fragility indicator and the vehicle's type, an optimization operation can be performed to determine the appropriate value to select for each parameter. For example, for determining the second warning threshold to be used for the acceleration force magnitude (braking), the minimum between the value selected based on the vehicle's type (e.g., here 0.7 g for the vehicle 110, which is of type 3 (heavy duty vehicle)) and the value selected based on the fragility indicator of the load transported during the second portion of the road (e.g., here 1.3 g for the vehicle 110) is selected. The value 0.7 g is selected and used as a second warning threshold for the acceleration force magnitude (braking) parameter in the second portion of the route. In some embodiments, a different optimization operation can be performed based on the type of parameter that is evaluated (e.g., maximum, minimum are non-limiting examples of these operations).

Referring back to FIG. 2C, at operation 207, the management server 140 transmits the second driving behavior parameter thresholds to the gateway device 105A. The thresholds include second harsh driving behavior thresholds for the second portion of the route 101. In some embodiments, they also include second warning thresholds for the second portion of the route 101. In some embodiments, instead of being determined at the management server 140, the warning thresholds can be determined at operation 292, by the gateway device 105A. For example, the gateway device 105A may determine the warning thresholds based on the received second harsh driving event thresholds.

Figure 2D:
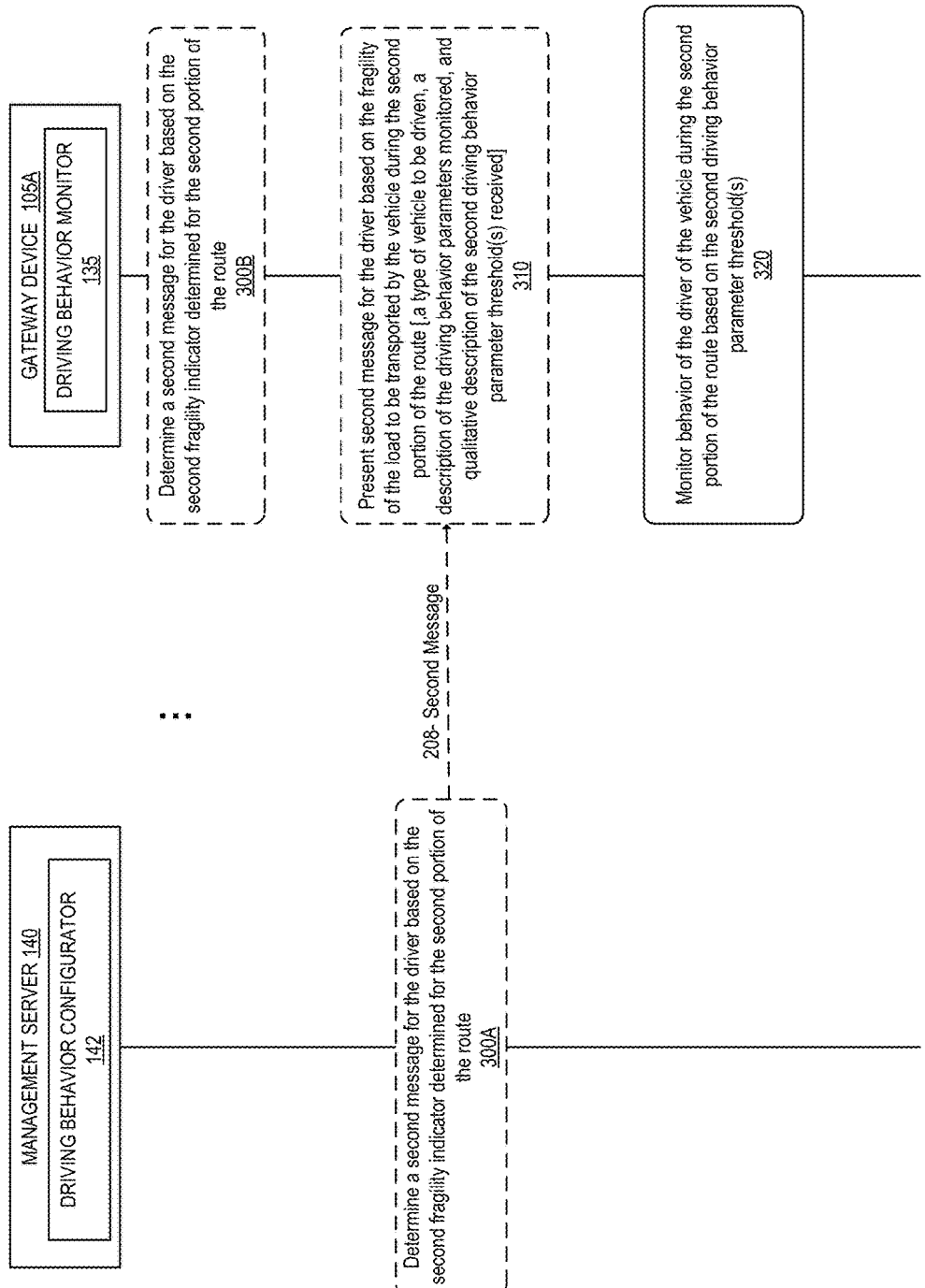
FIG. 2D illustrates a detailed transactional diagram of exemplary operations for monitoring the driving behavior of a driver of a vehicle during a second portion of a route, in accordance with some embodiments.

FIG. 2D illustrates a detailed transactional diagram of exemplary operations for monitoring the driving behavior of a driver of a vehicle during a second portion of a route, in accordance with some embodiments. In response to receiving the second driving behavior parameter thresholds from the management server 140, the gateway device 105A monitors, operation 320, driving behavior of the driver of the vehicle during the second portion of the route based on these thresholds. Thus, the driver is caused to adapt their behavior based on the fragility of the load of the vehicle during the second portion of the route 101.

In some embodiments, in addition to transmitting the driving behavior parameter thresholds, the management server 140 determines at operation 300A a second message (208) for the driver based on the second fragility indicator for the second portion of the route 101. The second message is adapted based on the fragility of the load that is transported by the vehicle. For example, the second messages may include a description of the type of the vehicle that is being driven, a description of the driving behavior parameter(s) monitored, and a qualitative description of the second driving behavior parameter threshold(s) received. As a non-limiting example, the second message can be an audio recording or a short video message. The second message can include the following exemplary information: "This is a Heavy Duty Vehicle", "there is no trailer attached" "Acceleration and Temperature are being monitored to detect Harsh Events to this Heavy Duty Vehicle." In other embodiments, additional or less information can be included in the second message. The gateway device 105A may present the second message (operation 310) for the driver. The second message enables the driver to obtain relevant information related to the driving behavior being monitored. In other embodiments, additional or less information can be included in the second message. In some embodiments, instead of being determined by the management server 140, the second message can be determined by the gateway device 105A. In one example, the gateway device 105A may be configured with several pre-recorded messages and may select one of the pre-recorded messages based on the fragility indicator determined for the second portion of the route 101. In other embodiments, no message is presented to the driver.

FIGS. 1A-B, 2A-D, 3, 4A-B illustrate mechanisms where the change in the fragility of the load transported by a vehicle (here vehicle 110) causes the monitoring of the driving behavior to be adapted based on this change. This enables a more accurate detection and categorization of harsh driving events. The mechanisms described herein provide a better and clearer measure of the type and frequency of incidents occurring to each transported asset and enables drivers to adapt their driving behavior based on the fragility of the load.

The operations in the flow diagrams of FIGS. 5A-6 will be described with reference to the exemplary embodiments of FIGS. 1-4B. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 5A:
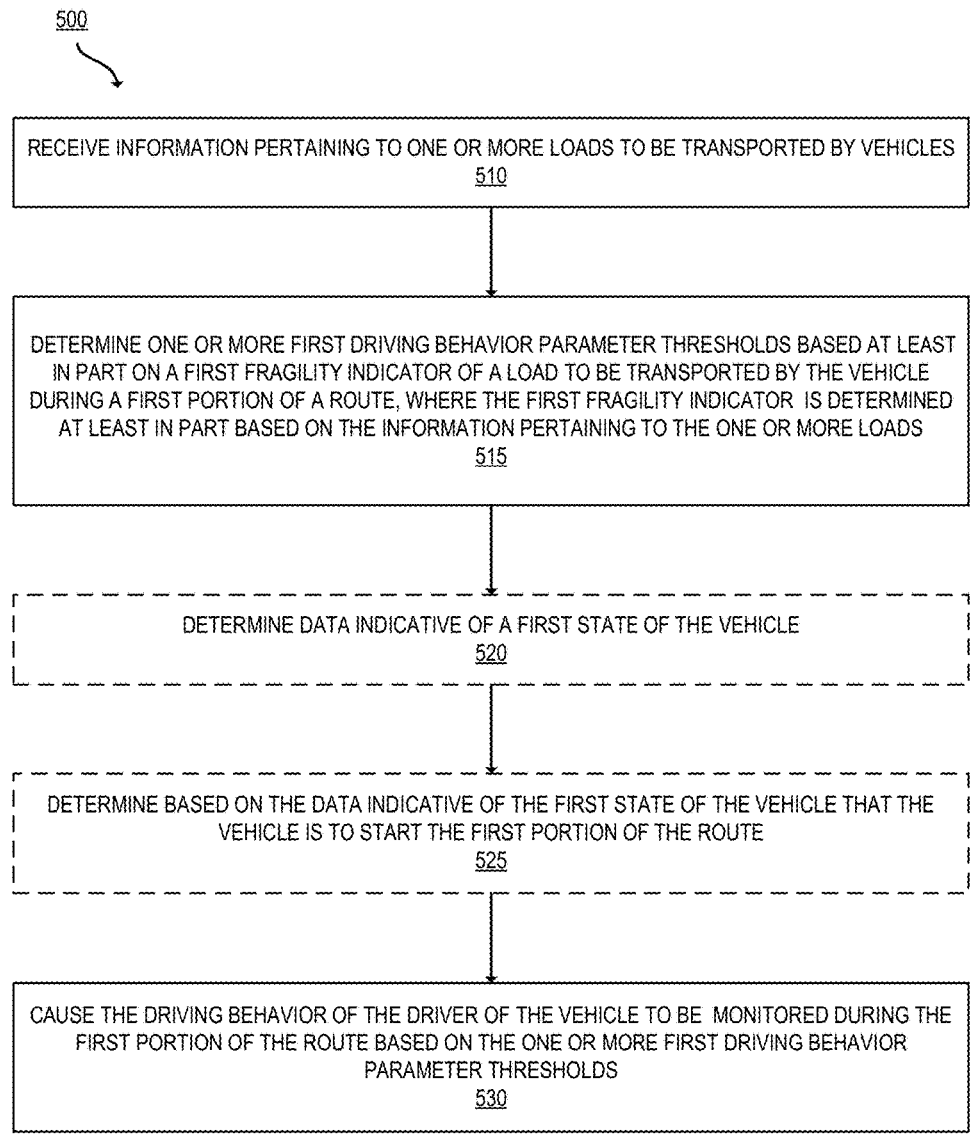
FIG. 5A illustrates a flow diagram of exemplary operations for adapting the monitoring of the driving behavior of a driver based on a first fragility indicator of the load that is to be transported, in accordance with some embodiments.

FIG. 5A illustrates a flow diagram of exemplary operations for adapting the monitoring of the driving behavior of a driver based on a first fragility indicator of the load that is to be transported, in accordance with some embodiments. At operation 510, the management server 140 receives information pertaining to one or more loads to be transported by vehicles. At operation 520, the management server 140, determines one or more first driving behavior parameter thresholds based at least in part on a first fragility indicator of a load to be transported by the vehicle during a first portion of a route. The first fragility indicator is determined at least in part based on the information pertaining to the one or more loads. In some embodiments, the first driving behavior parameter thresholds include first harsh driving event thresholds. In other embodiments, in addition to the first harsh driving event thresholds, the first driving behavior parameter thresholds include first warning thresholds. In some embodiments, the management server 140 determines, at operation 515, data indicative of a first state of the vehicle. The management server receives the data indicative of the first state of the vehicle, and determines, at operation 525, based on the data indicative of the first state of the vehicle that the vehicle is to start the first portion of the route. In these embodiments, the first driving behavior parameter thresholds are determined based on the first state of the vehicle and the data pertaining to the loads to be transported by vehicles. In other embodiments, the determination of the first thresholds is independent of the state of the vehicle. In these embodiments, the management server 140 determines for all portions of a route that is to be scheduled for a vehicle associated thresholds (e.g., first and second thresholds when the route includes a first and second portions) based on fragility indicators for each portion of the route in a single operation regardless of the state of the vehicle. These thresholds (first and second) can be transmitted to the gateway device 105A in a single operation as opposed to multiple operations.

The operations move to operation 530, at which the management server 140 causes the driving behavior of the driver of the vehicle to be monitored during the first portion of the route based on the first driving behavior parameter thresholds. In one embodiment, the driving behavior of the driver of the vehicle is caused to be monitored by transmitting the first driving behavior thresholds from the management server 140 to the gateway device. The gateway device uses the first driving behavior thresholds to monitor the driving behavior of the driver based on the fragility of the load that is to be transported by the vehicle. In other embodiments, the driving behavior of the driver of the vehicle is caused to be monitored by receiving at the management server 140 from the gateway device measurements indicating values of the monitored behavior driving parameters and monitoring the driving behavior at the management server 140 based on the first driving behavior thresholds and the measurements received. In these embodiments, the management server 140 may transmit alerts to the gateway device 105A upon determining that warning thresholds are reached and recording harsh events upon determining that harsh driving events are reached or exceeded. When harsh driving events are detected, the management server 140 can further alert a supervisor, administrator, or an enforcement authority that a harsh event occurred. In some embodiments, determination that driving behavior parameter (harsh driving event thresholds or warning thresholds) are reached or exceeded can result in these events being recorded for the vehicle and the driver. This data can then be accessed at a later time by a supervisor, the driver, a customer, or any other entity depending on authorization policy defined for the driving behavior monitoring system. For example, the events caused by a driver can be accessed through a graphical user interface. In some embodiments, the detection of the events causing the thresholds to be met or exceeded cause alerts and warning to be immediately transmitted to the corresponding entity (warning thresholds causing alerts to be sent to the driver, and harsh event thresholds causing alerts to be sent to a supervisor, administrator or enforcement authority).

Figure 5B:
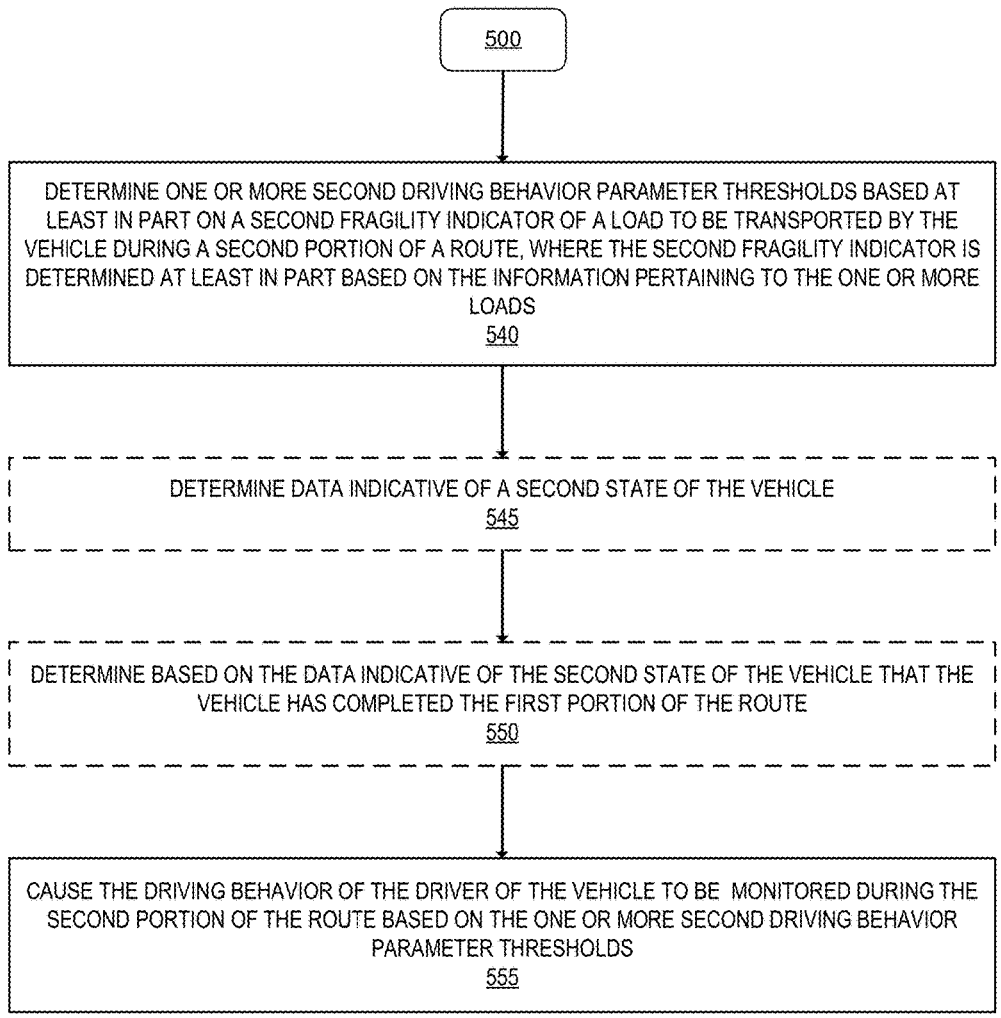
FIG. 5B illustrates a flow diagram of exemplary operations for adapting the monitoring of the driving behavior of a driver based on a second fragility indicator of the load that is to be transported, in accordance with some embodiments.

FIG. 5B illustrates a flow diagram of exemplary operations for adapting the monitoring of the driving behavior of a driver based on a second fragility indicator of the load that is to be transported, in accordance with some embodiments. The operations of FIG. 5B are performed following the operations 500 of FIG. 5A. At operation 540, determines one or more second driving behavior parameter thresholds based at least in part on a second fragility indicator of a load to be transported by the vehicle during a second portion of a route. The second fragility indicator is determined at least in part based on the information pertaining to the one or more loads. In some embodiments, the second driving behavior parameter thresholds include second harsh driving event thresholds. In other embodiments, in addition to the second harsh driving event thresholds, the second driving behavior parameter thresholds include second warning thresholds. In some embodiments, the management server 140 determines operation 545, data indicative of a second state of the vehicle. The management server 140 receives the data indicative of the second state of the vehicle from a gateway device 105A, and determines, operation 550, based on the data indicative of the second state of the vehicle that the vehicle is to start a second portion of the route. In these embodiments, the second driving behavior parameter thresholds are determined based on the second state of the vehicle and the data pertaining to the loads to be transported by vehicles. In other embodiments, the determination of the second thresholds is independent of the state of the vehicle. The management server 140 determines for all portions of a route that is to be scheduled for a vehicle associated thresholds based on fragility indicators for each portion of the route in a single operation regardless of the state of the vehicle. These thresholds (first and second) can be transmitted to the gateway device 105A in a single operation as opposed to multiple operations.

The flow of operations moves to operation 555, at which the management server 140 causes the driving behavior of the driver of the vehicle to be monitored during the second portion of the route based on the one or more second driving behavior parameter thresholds. In one embodiment, the driving behavior of the driver of the vehicle is caused to be monitored by transmitting the second driving behavior thresholds from the management server 140 to the gateway device. The gateway device uses the second driving behavior thresholds to monitor the driving behavior of the driver based on the fragility of the load that is to be transported by the vehicle during the second portion of the route. In other embodiments, the driving behavior of the driver of the vehicle is caused to be monitored by receiving at the management server 140, from the gateway device, measurements indicating values of the monitored behavior driving parameters and monitoring the driving behavior at the management server 140 based on the second driving behavior thresholds and the measurements received. In these embodiments, the management server 140 may transmit alerts to the gateway device 105A upon determining that warning thresholds are reached and may record the occurrence of harsh events upon determining that harsh driving events are reached or exceeded. When harsh driving events are detected, the management server 140 can further alert a supervisor, administrator, or an enforcement authority that a harsh event occurred.

Figure 6:
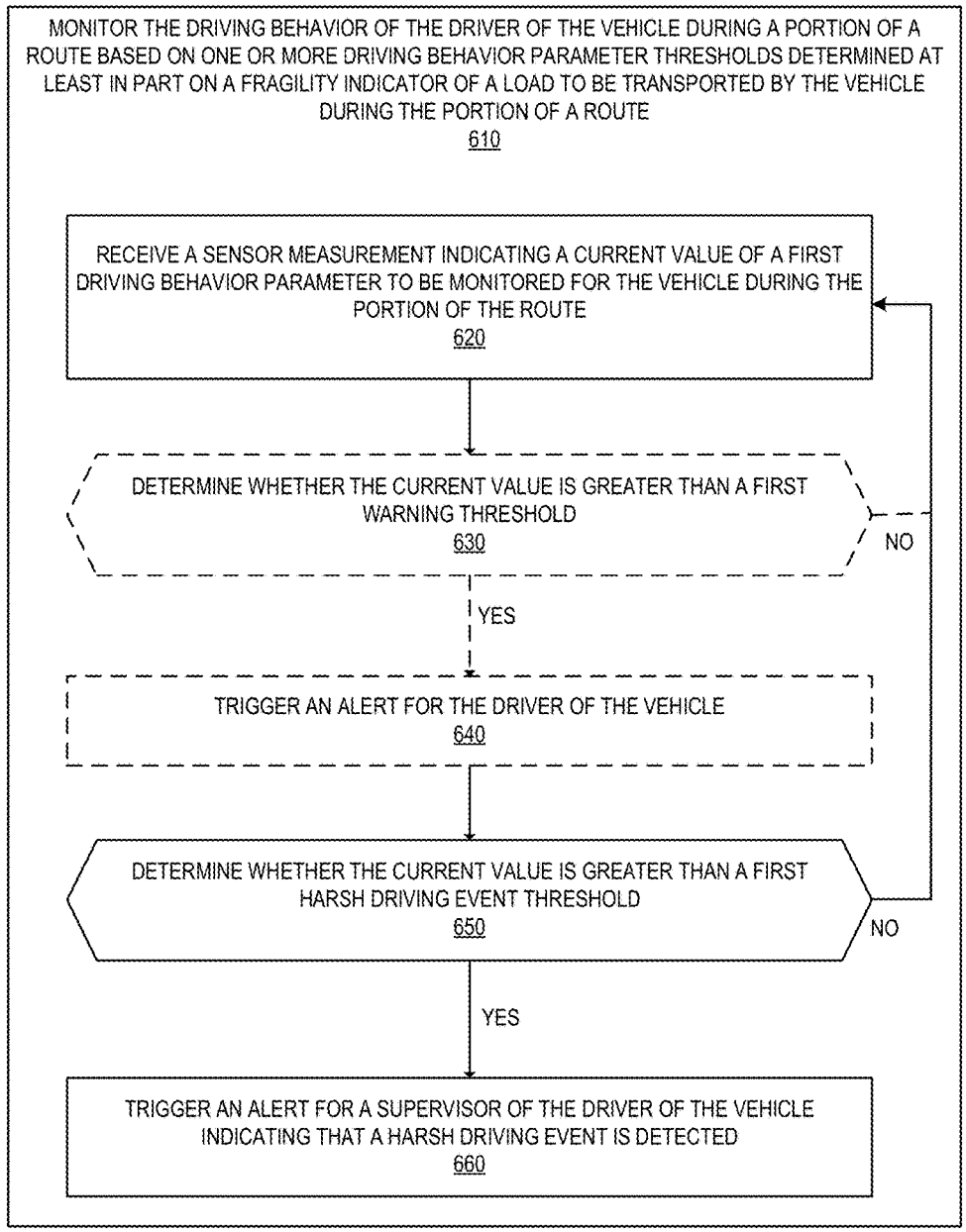
FIG. 6 illustrates a flow diagram of exemplary operations for monitoring the behavior of a driver, in accordance with some embodiments.

FIG. 6 illustrates a flow diagram of exemplary operations for monitoring the behavior of a driver, in accordance with some embodiments. In some embodiments, the operations of FIG. 6 can be performed by a gateway device (e.g., gateway device 105A) upon receipt of driving behavior parameter thresholds. Alternatively, in other embodiments, the operations of FIG. 6 can be performed by a management server (e.g., management server 140) in communication with a gateway device located on a vehicle. The operations below will be described with respect to a device performing the operations. The device is an electronic device that can be a gateway device or a management server. In some embodiments, the monitoring of the driving behavior of the driver can be used as part of a coaching or learning process for the driver. In these embodiments, a report can be generated for the driver at the end of the route including harsh events and/or warning events that were detected during the route. The report can be made available to the driver and/or another entity (such as a supervisor, an enforcement authority or an administrator of the system, etc.) through a graphical user interface. In some embodiments, the monitoring enables the driver and/or supervisor to receive alerts indicating the detection of harsh driving events and/or warnings that harsh driving events may occur during a route.

At operation 620, the device receives a sensor measurement indicating a current value of a first driving behavior parameter to be monitored for the vehicle during the portion of the route. The current value of the first driving behavior parameter is obtained by the gateway device at a given time t. The gateway device may obtain these values at a given frequency (e.g., every few seconds, every few milliseconds, every few micro-seconds, etc.) during the scheduled route. The sensor measurement is recorded at the gateway device. For example, in some embodiments, the sensor measurement is obtained from a WSD (e.g., one of the WSDs 121) by the gateway device 105 and is used by the driving behavior monitor 135. In other embodiments, the sensor measurement are obtained by the gateway device from the vehicle's computing device. In some embodiments, the sensor measurements are used at the gateway device to perform the following operations, while in other embodiments, the sensor measurements are transmitted to the management server at regular interval such that the management server may perform the following operations enabling the monitoring of the driving behavior of the driver in real time.

At operation 630, the device determines whether the current value of the first driving behavior parameter is greater than a first warning parameter threshold. In some embodiments, greater than can include greater or equal to the first waring parameter threshold. In other embodiments, greater than can include strictly greater than the first warning parameter threshold. When the current value is greater than the first warning parameter threshold, the flow moves to operation 640, at which an alert is triggered for the driver of the vehicle. The first warning threshold is an intermediary threshold which when reached for a given driving behavior parameter causes an alert or warning to be triggered for the driver. As opposed to harsh driving event thresholds, a warning threshold is not indicative that a harsh event or unsafe event has occurred. Instead, this threshold is used to warn the driver prior to the occurrence of a harsh event. In some embodiments, this threshold can be used as part of a coaching or learning process for the driver. The alert can be presented to the driver immediately following the occurrence of the driving behavior that caused a measure of a driving behavior parameter to reach or exceed the corresponding warning threshold. The alert informs the driver that their behavior if not modified can cause the occurrence of a harsh driving event. In some embodiments, the actions that caused the warning thresholds to be reached or exceeded may be recorded and may be presented as part of a driving performance report for the driver along route 101. In other embodiments, these actions are not recorded and only the alert is transmitted to the driver. The warning thresholds are determined based on the fragility of the load. In some embodiments, the vehicle's type is also taken into consideration. In additional embodiments, additional conditions can be taken into account when determining the warning thresholds. For example, weather conditions, time of day (night or day), information about the driving history of the driver (e.g., hours driven without a break, history of harsh events, etc.), road conditions, vehicle's speed, traffic data, history of harsh events for the vehicle, history of harsh events for similar vehicles, vehicle inspection report of the vehicle, can be used to dynamically update and/or modify the warning thresholds such that the driver is warned of potentially unsafe driving behavior based on current conditions of the vehicle, the weather and the environment.

The flow of operations moves to operation 650, at which the device determines whether the current value is greater than a first harsh driving event threshold. In some embodiments, greater than can include greater or equal to the first harsh driving event threshold. In other embodiments, greater than can include strictly greater than the first harsh driving event threshold. When the current value is greater than a first harsh driving event threshold is greater than the first harsh driving event threshold, the device triggers, at operation 660, an alert for a supervisor of the driver of the vehicle indicating that a harsh driving event is detected. The alert informs a supervisor, an administrator, or an enforcement authority that the behavior of the driver has cause the occurrence of a harsh driving event. In some embodiments, the detection of the harsh driving event is recorded as part of a report including the driving performance report of the driver along route 101.

The embodiments described herein present several advantages with respect to conventional driving behavior monitoring system. In these embodiments, a change in the fragility of the load transported in a vehicle causes a change in the driving behavior parameter thresholds used for monitoring the driving behavior of a driver. Thus, while the vehicle's type does not change during a route scheduled for a vehicle, a fragility indicator may be updated depending on the load that is being transported during a portion of the load causing the driving behavior to be monitored differently when the load changes. Thus, the embodiments allow for a monitoring of a driver's behavior that is adapted to the fragility of the load that is transported. The mechanisms described, enables a more accurate detection and categorization of harsh driving events by taking into account the fragility of the load. The mechanisms described herein provide a better and clearer measure of the type and frequency of incidents occurring to each transported asset and enable drivers to adapt their driving behavior based on the fragility of the load.

Architecture

The gateway devices and the management server described with reference to FIGS. 1A-6 are electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 7:
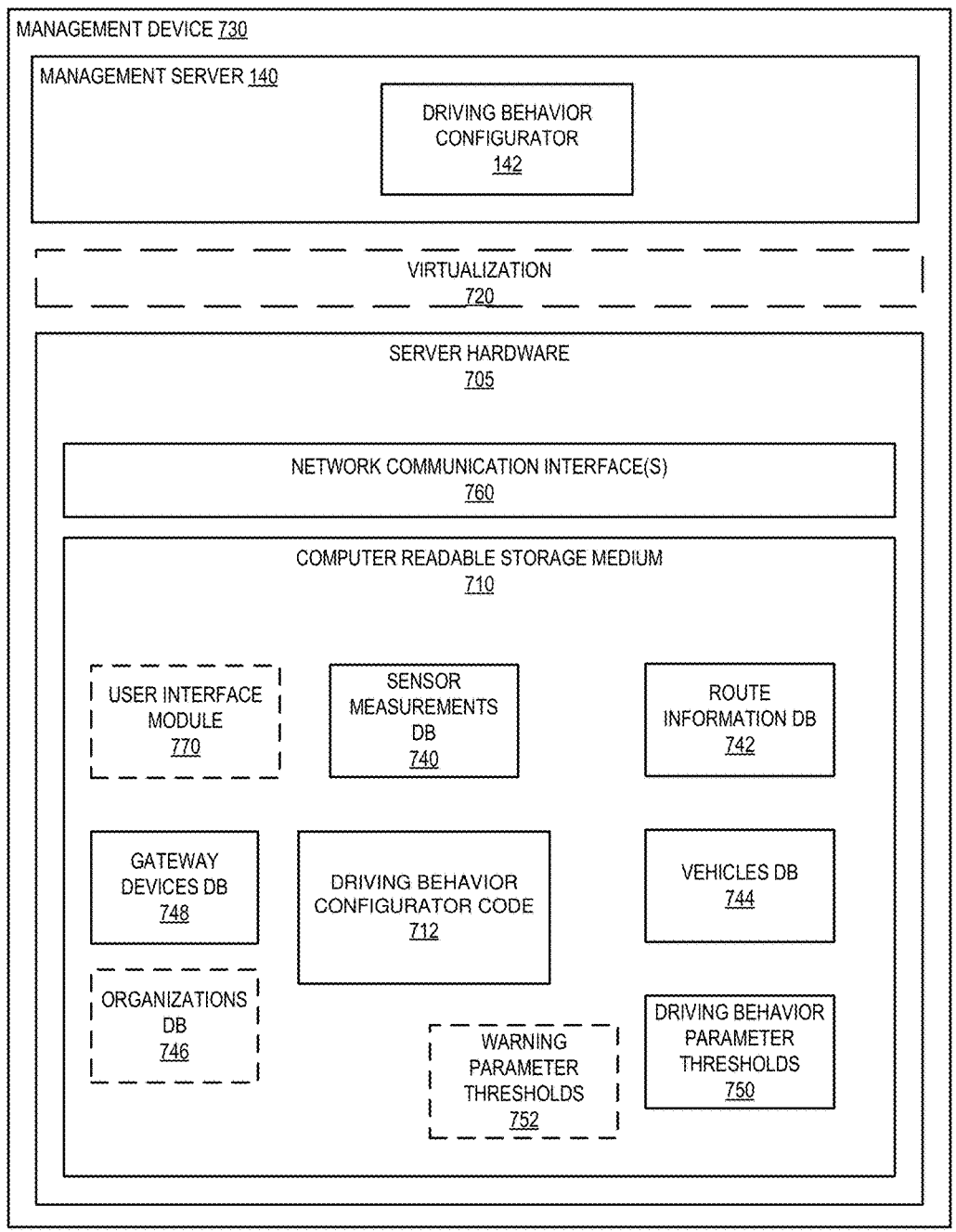
FIG. 7 illustrates a block diagram for an exemplary server management that can be used in some embodiments.

FIG. 7 illustrates a block diagram for an exemplary server management that can be used in some embodiments. Management server 140 may be a Web or cloud server, or a cluster of servers, running on server hardware. In one embodiment, the management server 140 works for both single and multi-tenant installations, meaning that multiple organizations with different administrators may have wireless sensing devices and gateway devices managed by the same management server.

According to one embodiment, management server 140 is implemented on a server device 730, which includes server hardware 705. Server hardware 705 includes network communication interfaces 760 coupled with a computer readable storage medium 710. The computer readable storage medium 710 includes driving behavior configurator code 712. The computer readable storage medium 710 includes a driving behavior parameter thresholds, vehicles database 744 (including information regarding the vehicles), an optional organizations database 746 (including information regarding the organizations to which the gateway devices, the vehicles, or the trailers belong); a gateway devices database 748 (including information regarding the gateway devices), a warning parameter thresholds database 752, and a route information database 742 (including information related to route).

While one embodiment does not implement virtualization, alternative embodiments may use different forms of virtualization—represented by a virtualization layer 720. In these embodiments, the management server 140 and the hardware that executes it form a virtual management server, which is a software instance of the modules stored on the computer readable storage medium 710.

Figure 8:
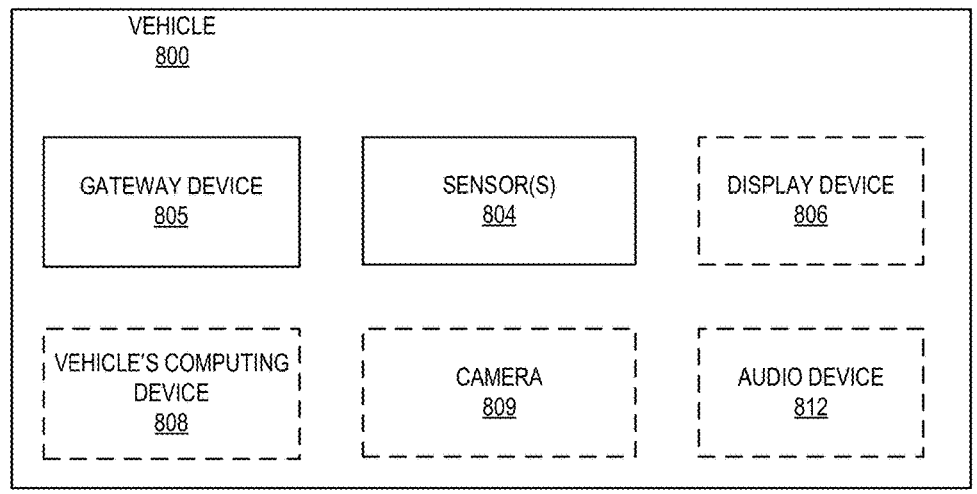
FIG. 8 illustrates a block diagram of an exemplary vehicle that can be used in some embodiments.

FIG. 8 illustrates a block diagram of an exemplary vehicle that can be used in some embodiments. Vehicle 800 includes a computing device 808. The computing device is an electronic device installed by the manufacturer of the vehicle. The vehicle 800 may include one or more sensors 804 that can be installed by the manufacturer of the vehicle or aftermarket sensors. The sensors are electronic devices operative to record and transmit data through the gateway device 805 towards a management server. The vehicle may further include a camera 809, a display device 806, and an audio device 812. The display device 806 and the audio device 812 can be used to present the alerts to a driver of the vehicle upon detection that warning thresholds and/or harsh driving event thresholds are reached or exceeded.

Figure 9:
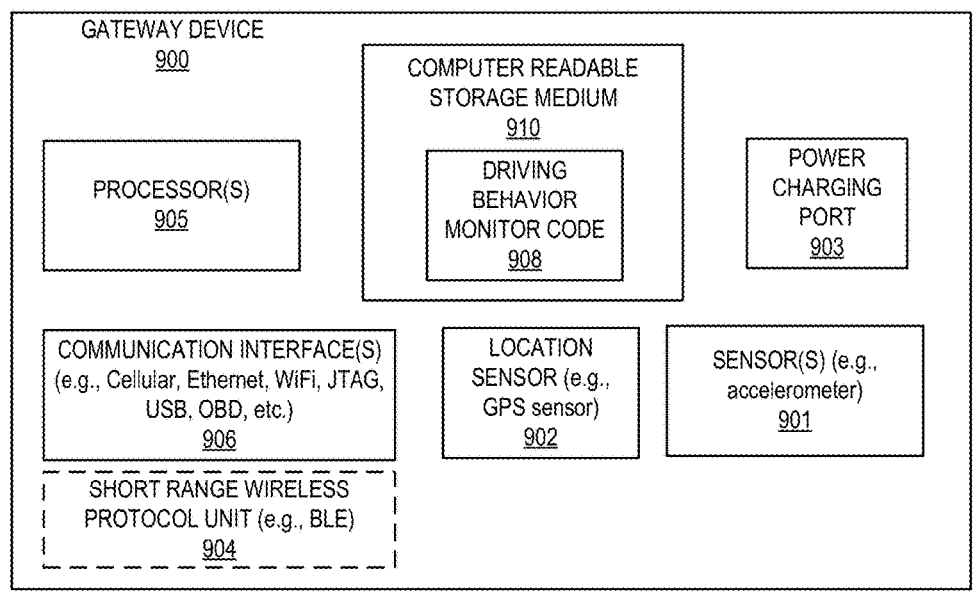
FIG. 9 illustrates a block diagram of an exemplary gateway device that can be used in some embodiments.

FIG. 9 illustrates a block diagram of an exemplary gateway device that can be used in some embodiments. Gateway device 900 includes one or more processors 905 and connected system components (e.g., multiple connected chips). The gateway device 900 includes computer readable storage medium 910, which is coupled to the processor(s) 905. The computer readable storage medium 910 may be used for storing data, metadata, and programs for execution by the processor(s) 905. For example, the depicted computer readable storage medium 910 may store driving behavior monitor code 908 that, when executed by the processor(s) 905, causes the gateway device 900 (e.g., gateway device 105) to perform operations as described with respect of the embodiments of FIGS. 1A-6.

The gateway device 900 also includes one or more sensors used to record sensor measurements in response to physical events. For example, the gateway device 900 may include a location sensor (such as a GPS sensor) 902 for recording location readings to indicate the location of the vehicle on which the gateway device is mounted. The gateway device 900 may include one or more other sensors 901 (e.g., an accelerometer).

The gateway device 900 also includes one or more communication interfaces 906, which are provided to allow a user to provide input to, receive output from, and otherwise transfer data to and from the gateway device. Exemplary Input/Output devices and interfaces 906 include wired and wireless transceivers, such as Joint Test Action Group (JTAG) transceiver, a Bluetooth Low Energy (LE) transceiver, an IEEE 802.11 transceiver, an infrared transceiver, a wireless cellular telephony transceiver (e.g., 2G, 3G, 4G), or another wireless protocol to connect the gateway device 900 with another device, external component, or a network and receive stored instructions, data, tokens, etc. It will be appreciated that one or more buses may be used to interconnect the various components shown in FIG. 9.

It will be appreciated that additional components, not shown, may also be part of the gateway device 900, the vehicle 800, or the management device 730, and, in certain embodiments, fewer components than that shown in FIG. 9, FIG. 8, or FIG. 7 may also be used in a gateway device 900, a vehicle 800, or a management device 730.

While some components of the gateway device, or the management server are illustrated as code stored on the computer readable storage medium, in other embodiments the modules may be implemented in hardware or in a combination of hardware and software. While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a management server device of automatically monitoring driving behavior of a driver of a vehicle, the method comprising:
   receiving information pertaining to one or more loads to be transported by vehicles;
   determining one or more first driving behavior parameter thresholds based at least in part on a first fragility indicator of a load to be transported by the vehicle during a first portion of a route, wherein the first fragility indicator is determined at least in part based on the information pertaining to the one or more loads;
   determining data indicative of a first state of the vehicle;
   determining based on the data indicative of the first state of the vehicle that the vehicle is to start the first portion of the route; and
   responsive to determining that the vehicle is to start the first portion of the route, causing an electronic device to monitor the driving behavior of the driver of the vehicle during the first portion of the route based on the one or more first driving behavior parameter thresholds.

2. The method of claim 1 further comprising:
   determining a first message for the driver based on the first fragility indicator, wherein the first message includes a description of a fragility of the load that is to be transported during the first portion of the route.

3. The method of claim 1, wherein the management server device is part of a fleet management system located in the cloud, and the determining the data indicative of a first state of the vehicle includes:
   receiving, from a gateway device located on the vehicle, the data indicative of the first state of the vehicle; and
   wherein the causing the driving behavior of the driver of the vehicle to be monitored includes:
      transmitting the one or more first driving behavior parameter thresholds to the gateway device, and
      causing the gateway device to monitor the driving behavior of the driver based on the one or more first driving behavior parameter thresholds and based on one or more sensor measurements indicating one or more current values of one or more first driving behavior parameters.

4. The method of claim 1 further comprising:
   determining one or more second driving behavior parameter thresholds based at least in part on a second fragility indicator of a load to be transported by the vehicle during a second portion of the route, wherein the second fragility indicator is determined at least in part based on the information pertaining to the one or more loads; and
   causing the driving behavior of the driver of the vehicle to be monitored during the second portion of the route based on the one or more second driving behavior parameter thresholds.

5. The method of claim 4 further comprising:
   determining data indicative of a second state of the vehicle; and
   determining based on the data indicative of the second state of the vehicle that the vehicle has completed the first portion of the route.

6. The method of claim 4, wherein the information pertaining to one or more loads to be transported by vehicles includes the first fragility indicator and the second fragility indicator that is different than the first fragility indicator.

7. The method of claim 1, wherein the determining the one or more first driving behavior parameter thresholds includes:
   determining one or more first harsh driving event thresholds for the first portion of the route; and
   wherein to monitor the driving behavior of the driver of the vehicle is performed at least in part based on the one or more first harsh driving event thresholds and includes to:
      determine whether a current value of a first driving behavior parameter is greater than a first harsh driving event threshold from the one or more first harsh driving event thresholds, and
      responsive to determining that the current value of the first driving behavior parameter is greater than the first harsh driving event threshold, trigger an alert for a supervisor of the driver of the vehicle indicating that a harsh driving event is detected during the first portion of the route.

8. The method of claim 1, wherein the determining the one or more first driving behavior parameter thresholds includes:
   determining one or more first warning thresholds for the first portion of the route; and
   wherein to monitor the driving behavior of the driver of the vehicle is performed at least in part based on the one or more first warning thresholds and includes:
      determining whether a current value of a first driving behavior parameter is greater than a first warning threshold from the one or more first warning thresholds, and
      responsive to determining that the current value of the first driving behavior parameter is greater than the first warning threshold, triggering an alert for the driver of the vehicle.

9. A management server device located in the cloud for automatically monitoring driving behavior of a driver of a vehicle, the management server device comprising:
   a non-transitory computer readable storage medium to store instructions; and
   a processor coupled with the non-transitory computer readable storage medium to process the stored instructions to:
      receive information pertaining to one or more loads to be transported by vehicles,
      determine one or more first driving behavior parameter thresholds based at least in part on a first fragility indicator of a load to be transported by the vehicle during a first portion of a route, wherein the first fragility indicator is determined at least in part based on the information pertaining to the one or more loads, determine data indicative of a first state of the vehicle;

determine based on the data indicative of the first state of the vehicle that the vehicle is to start the first portion of the route; and responsive to determining that the vehicle is to start the first portion of the route, cause an electronic device to monitor the driving behavior of the driver of the vehicle during the first portion of the route based on the one or more first driving behavior parameter thresholds.

10. The management server device of claim 9, wherein the processor is further to:

determine a first message for the driver based on the first fragility indicator, wherein the first message includes a description of a fragility of the load that is to be transported during the first portion of the route.

11. The management server device of claim 9, wherein:

to determine the data indicative of a first state of the vehicle includes to:

receive, from a gateway device located on the vehicle, the data indicative of the first state of the vehicle; and to cause the driving behavior of the driver of the vehicle to be monitored includes to:

transmit the one or more first driving behavior parameter thresholds to the gateway device, and cause the gateway device to monitor the driving behavior of the driver based on the one or more first driving behavior parameter thresholds and based on one or more sensor measurements indicating one or more current values of one or more first driving behavior parameters.

12. The management server device of claim 9, wherein the processor is further to:

determine one or more second driving behavior parameter thresholds based at least in part on a second fragility indicator of a load to be transported by the vehicle during a second portion of the route, wherein the second fragility indicator is determined at least in part based on the information pertaining to the one or more loads; and cause the driving behavior of the driver of the vehicle to be monitored during the second portion of the route based on the one or more second driving behavior parameter thresholds.

13. The management server device of claim 12, wherein the processor is further to:

determine data indicative of a second state of the vehicle; and determine based on the data indicative of the second state of the vehicle that the vehicle has completed the first portion of the route.

14. The management server device of claim 12, wherein the information pertaining to one or more loads to be transported by vehicles includes the first fragility indicator and the second fragility indicator that is different than the first fragility indicator.

15. The management server device of claim 9, wherein to determine the one or more first driving behavior parameter thresholds includes to:

determine one or more first harsh driving event thresholds for the first portion of the route; and wherein to monitor the driving behavior of the driver of the vehicle is performed at least in part based on the one or more first harsh driving event thresholds and includes to:

determine whether a current value of a first driving behavior parameter is greater than a first harsh driving event threshold from the one or more first harsh driving event thresholds, and responsive to determining that the current value of the first driving behavior parameter is greater than the first harsh driving event threshold, trigger an alert for a supervisor of the driver of the vehicle indicating that a harsh driving event is detected during the first portion of the route.

16. The management server device of claim 9, wherein to determine the one or more first driving behavior parameter thresholds includes to:

determine one or more first warning thresholds for the first portion of the route; and wherein to monitor the driving behavior of the driver of the vehicle is performed at least in part based on the one or more first warning thresholds and includes to:

determine whether a current value of a first driving behavior parameter is greater than a first warning threshold from the one or more first warning thresholds, and responsive to determining that the current value of the first driving behavior parameter is greater than the first warning threshold, trigger an alert for the driver of the vehicle.

17. A non-transitory computer readable storage medium that provides instructions, which when executed by a processor of a management server device located in the cloud, cause said processor to perform operations comprising:

receiving information pertaining to one or more loads to be transported by vehicles;

determining one or more first driving behavior parameter thresholds based at least in part on a first fragility indicator of a load to be transported by a vehicle during a first portion of a route, wherein the first fragility indicator is determined at least in part based on the information pertaining to the one or more loads;

determining data indicative of a first state of the vehicle;

determining based on the data indicative of the first state of the vehicle that the vehicle is to start the first portion of the route; and responsive to determining that the vehicle is to start the first portion of the route, causing an electronic device to monitor the driving behavior of a driver of the vehicle during the first portion of the route based on the one or more first driving behavior parameter thresholds.

18. The non-transitory computer readable storage medium of claim 17, wherein the operations further comprise:

determining a first message for the driver based on the first fragility indicator, wherein the first message includes a description of a fragility of the load that is to be transported during the first portion of the route.

19. The non-transitory computer readable storage medium of claim 17, wherein the management server device is part of a fleet management system located in the cloud, and the determining the data indicative of a first state of the vehicle includes:

receiving, from a gateway device located on the vehicle, the data indicative of the first state of the vehicle; and wherein causing the driving behavior of the driver of the vehicle to be monitored includes:

transmitting the one or more first driving behavior parameter thresholds to the gateway device, and causing the gateway device to monitor the driving behavior of the driver based on the one or more first driving behavior parameter thresholds and based on one or more sensor measurements indicating one or more current values of one or more first driving behavior parameters.

20. The non-transitory computer readable storage medium of claim 17, wherein the operations further comprise:

determining one or more second driving behavior parameter thresholds based at least in part on a second fragility indicator of a load to be transported by the vehicle during a second portion of the route, wherein the second fragility indicator is determined at least in part based on the information pertaining to the one or more loads; and causing the driving behavior of the driver of the vehicle to be monitored during the second portion of the route based on the one or more second driving behavior parameter thresholds.

21. The non-transitory computer readable storage medium of claim 20, wherein the operations further comprise:

determining data indicative of a second state of the vehicle; and determining based on the data indicative of the second state of the vehicle that the vehicle has completed the first portion of the route.

22. The non-transitory computer readable storage medium of claim 20, wherein the information pertaining to one or more loads to be transported by vehicles includes the first fragility indicator and the second fragility indicator that is different than the first fragility indicator.

23. The non-transitory computer readable storage medium of claim 17, wherein the determining the one or more first driving behavior parameter thresholds includes:

determining one or more first harsh driving event thresholds for the first portion of the route; and wherein to monitor the driving behavior of the driver of the vehicle is performed at least in part based on the one or more first harsh driving event thresholds and includes to:

determine whether a current value of a first driving behavior parameter is greater than a first harsh driving event threshold from the one or more first harsh driving event thresholds, and responsive to determining that the current value of the first driving behavior parameter is greater than the first harsh driving event threshold, trigger an alert for a supervisor of the driver of the vehicle indicating that a harsh driving event is detected during the first portion of the route.

24. The non-transitory computer readable storage medium of claim 17, wherein the determining the one or more first driving behavior parameter thresholds includes:

determining one or more first warning thresholds for the first portion of the route; and wherein to monitor the driving behavior of the driver of the vehicle is performed at least in part based on the one or more first warning thresholds and includes:

determining whether a current value of a first driving behavior parameter is greater than a first warning threshold from the one or more first warning thresholds, and responsive to determining that the current value of the first driving behavior parameter is greater than the first warning threshold, triggering an alert for the driver of the vehicle.

* * * * *